United States Patent
Cole et al.

(10) Patent No.: US 9,650,791 B2
(45) Date of Patent: *May 16, 2017

(54) INTEGRATED FIBER CEMENT AND FOAM AS INSULATED CLADDING WITH ENHANCEMENTS

(71) Applicant: James Hardie Technology Limited, Dublin (IE)

(72) Inventors: Dawn Cole, Fontana, CA (US); George Elizarraras, Fontana, CA (US); Hui Li, Fontana, CA (US); Kevin O'Leary, Fontana, CA (US); Sean O'Leary, Fontana, CA (US)

(73) Assignee: James Hardie Technology Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 15/014,891

(22) Filed: Feb. 3, 2016

(65) Prior Publication Data
US 2016/0194882 A1    Jul. 7, 2016

Related U.S. Application Data

(63) Continuation of application No. 14/390,369, filed as application No. PCT/US2013/035033 on Apr. 2, 2013, now Pat. No. 9,260,864.
(Continued)

(51) Int. Cl.
*E04C 1/00* (2006.01)
*E04F 13/08* (2006.01)
(Continued)

(52) U.S. Cl.
CPC ............ *E04F 13/0866* (2013.01); *E04B 2/28* (2013.01); *E04C 2/205* (2013.01); *E04C 2/243* (2013.01);
(Continued)

(58) Field of Classification Search
CPC ...... E04B 1/7069; E04B 1/7645; E04B 1/765; E04B 2/707; E04F 13/076; E04F 13/0817; E04F 13/0894
(Continued)

(56) References Cited

U.S. PATENT DOCUMENTS

| 4,369,610 A | * | 1/1983 | Volan .............. E04F 13/12 52/489.1 |
| 4,408,434 A | | 10/1983 | Collins |

(Continued)

FOREIGN PATENT DOCUMENTS

WO    WO 2013/152048    10/2013

OTHER PUBLICATIONS

International Search Report and Written Opinion for corresponding PCT Application No. PCT/US2013/035033, filed Apr. 2, 2013, dated Jul. 12, 2013, 18 pages.
(Continued)

*Primary Examiner* — Chi Q Nguyen
(74) *Attorney, Agent, or Firm* — Knobbe Martens Olson & Bear, LLP

(57) ABSTRACT

An integrated fiber cement and foam cladding system is provided that incorporates foam or similar light weight material to improve the insulation capacity of the cladding system. The system includes at least a fiber cement layer and a foam layer disposed on the backside of the fiber cement layer. The system improves the R-value of the building, a measure of the building's resistance to transferring heat or thermal energy.

13 Claims, 35 Drawing Sheets

Related U.S. Application Data

(60) Provisional application No. 61/619,872, filed on Apr. 3, 2012.

(51) Int. Cl.

| | | |
|---|---|---|
| *E04F 13/14* | (2006.01) | |
| *E04F 19/06* | (2006.01) | |
| *E04B 2/28* | (2006.01) | |
| *E04C 2/20* | (2006.01) | |
| *E04C 2/24* | (2006.01) | |
| *E04C 2/288* | (2006.01) | |
| *E04B 2/00* | (2006.01) | |
| *E04C 2/52* | (2006.01) | |
| *E04F 13/00* | (2006.01) | |
| *E04F 13/21* | (2006.01) | |
| E04F 13/076 | (2006.01) | |
| E04B 1/70 | (2006.01) | |
| E04B 1/76 | (2006.01) | |
| E04B 2/70 | (2006.01) | |
| E04C 2/00 | (2006.01) | |

(52) U.S. Cl.
CPC .............. *E04C 2/246* (2013.01); *E04C 2/288* (2013.01); *E04C 2/46* (2013.01); *E04C 2/52* (2013.01); *E04F 13/007* (2013.01); *E04F 13/0864* (2013.01); *E04F 13/0869* (2013.01); *E04F 13/0878* (2013.01); *E04F 13/0894* (2013.01); *E04F 13/141* (2013.01); *E04F 13/148* (2013.01); *E04F 13/21* (2013.01); *E04F 19/064* (2013.01); *E04B 1/7069* (2013.01); *E04B 1/765* (2013.01); *E04B 1/7645* (2013.01); *E04B 2/707* (2013.01); *E04C 2002/004* (2013.01); *E04F 13/076* (2013.01); *E04F 13/0817* (2013.01); *E04F 2201/0107* (2013.01); *E04F 2203/04* (2013.01); *E04F 2290/041* (2013.01)

(58) Field of Classification Search
USPC ........... 52/302.7, 302.6, 309.4, 309.5, 302.1, 52/302.2, 309.12, 309.16, 309.17
See application file for complete search history.

(56) References Cited

U.S. PATENT DOCUMENTS

| | | |
|---|---|---|
| 4,492,064 A | 1/1985 | Bynoe |
| 4,730,953 A | 3/1988 | Tarko |
| 5,369,926 A | 12/1994 | Borland |
| 5,377,468 A | 1/1995 | Repasky |
| 5,473,847 A | 12/1995 | Crookston |
| 5,502,940 A * | 4/1996 | Fifield ..................... B28B 3/123 52/309.11 |
| 5,927,032 A | 7/1999 | Record |
| 5,987,835 A * | 11/1999 | Santarossa .............. E04F 13/04 52/309.8 |
| 6,418,686 B1 | 7/2002 | Record |
| 7,762,040 B2 | 7/2010 | Wilson et al. |
| 8,555,581 B2 | 10/2013 | Amend |
| 8,590,236 B2 | 11/2013 | Schaefer |
| 8,910,444 B2 | 12/2014 | Wilson et al. |
| 8,978,325 B2 * | 3/2015 | Lewis ................... E04B 1/7675 52/220.2 |
| 9,260,864 B2 * | 2/2016 | Cole ..................... E04F 13/148 |
| 2005/0081468 A1 | 4/2005 | Wilson et al. |
| 2008/0034690 A1 | 2/2008 | Gartz et al. |
| 2008/0083184 A1 | 4/2008 | Smith |
| 2009/0266025 A1 | 10/2009 | Toas et al. |
| 2010/0064611 A1 | 3/2010 | Holt et al. |
| 2010/0218434 A1 | 9/2010 | Bennett |
| 2010/0242398 A1 | 9/2010 | Cullen |
| 2010/0319288 A1 | 12/2010 | Morse et al. |
| 2011/0154759 A1 | 6/2011 | Wilson et al. |
| 2011/0214372 A1* | 9/2011 | Mullet ................. E04F 13/075 52/309.4 |
| 2011/0252728 A1* | 10/2011 | Scherrer .............. E04B 1/7675 52/220.1 |
| 2011/0296785 A1 | 12/2011 | Holt |
| 2012/0023849 A1 | 2/2012 | Holt et al. |
| 2012/0297697 A1 | 11/2012 | Schaefer |
| 2012/0324814 A1 | 12/2012 | Amend |
| 2015/0047281 A1 | 2/2015 | Cole et al. |

OTHER PUBLICATIONS

International Preliminary Report on Patentability for corresponding PCT Application No. PCT/US2013/035033, filed Apr. 2, 2013, dated Mar. 21, 2014, 11 pages.

* cited by examiner

INTEGRATED FIBER CEMENT AND FOAM AS INSULATED CLADDING WITH ENHANCEMENTS

CROSS-REFERENCE TO RELATED APPLICATIONS

This application is a continuation of U.S. patent application Ser. No. 14/390,369, entitled "Integrated Fiber Cement and Foam as Insulated Cladding with Enhancements," filed Oct. 2, 2014, now U.S. Pat. No. 9,260,864, which is a national phase entry of PCT Application Number PCT/US13/35033, filed Apr. 2, 2013, which claims the benefit of priority under 35 U.S.C. §119(e) of U.S. Provisional Application No. 61/619,872, filed on Apr. 3, 2012. Each of the applications referenced in this paragraph is incorporated herein by reference in its entirety.

BACKGROUND OF THE INVENTION

Field of the Invention

The present disclosure generally relates to building construction materials and methods, and more particularly relates to composite fiber cement cladding with improved properties and methods of installing such material.

Description of the Related Art

The future of building construction is moving towards providing an insulated, energy efficient building envelope. In particular, there is an increasing demand for energy efficient residential and commercial constructions which require walls having greater building insulation ratings. The R-value of building insulation is a measure of its resistance to transferring heat or thermal energy. Greater R-values indicate more effective building insulation. The higher the R-value of the insulation of a building, the easier it is to maintain a temperature differential between the interior and the exterior of the building over an extended period of time. One approach to improving the energy efficiency of a building structure is to add insulation to the exterior walls. Adding additional wall insulation, however, can drive up the cost of construction as it requires additional material and installation labor. Adding additional exterior wall insulation can adversely affect the aesthetics, water management, and other properties of the wall structure assembly, as well as impact the design of other components of the wall.

Foamed material is one type of material that can be used to insulate building structures. While foamed material has been used as an insulation material in certain building construction, it has not been used as efficiently and effectively as it could be. For example, foam sheathing or backing boards have been placed between the framing and fiber cement exterior sidings of a building structure to provide additional insulation. The foam sheathing or backing boards are typically tacked or fastened to the framing prior to installation of the exterior cladding. To reduce the amount of air exchanged between the inside and the outside of the building structure, the seams of the foam sheathing or backing boards often need to be sealed or taped. As such, the installation of the foam sheathing requires additional processing steps. The foam installation may also create aesthetic issues with the exterior siding, such as causing a wavy appearance as when siding is installed over deformations in the foam where fasteners compress the underlying foam.

Additionally, in high-wind regions, sidings are frequently blown off walls of building structures. To improve wind resistance, shims are often used to create a uniform and flat surface for attachment of the sidings so as to reduce gaps that could catch the wind. Face nailing instead of blind nailing is also recommended, particularly for fiber cement sidings in regions with high wind speed. However, these existing methods for enhancing wind resistance of sidings require additional material and labor, and can detract from the aesthetics of exterior building structure.

In view of the foregoing, there is a need for a different building construction material and technique for improving the insulation of building structures and improving the wind resistance of exterior sidings. There is also a need for an improved fiber cement composite insulation building material designed without the shortcomings of existing site assembled systems that incorporate foam as an insulating material.

SUMMARY OF THE INVENTION

Accordingly, disclosed herein are integrated fiber cement and foam cladding systems that incorporate foam or similar light weight material, such as lightweight mats of fiberglass or rockwool, for improving the insulation capacity of a cladding material. In various embodiments, the integrated fiber cement and foam cladding system is designed to improve existing uses of foam and fiber cement during the construction of a wall or other structure in one or more of the following areas: reduced installation time, increase wind loads, simplified assembly, nail holding ability, resistance to thermal bridging, water management, and transportation. As used herein, the terms "foam" or "foamed material" are broad terms and shall have their ordinary meaning and shall include, but not be limited to polymeric foams, inorganic foams, cementitious foams, glass foams, ceramic foams, metallic foams, aerogels, syntactic foams and the like in a substantially solid state.

In one application, the integrated fiber cement and foam system of the present disclosure is prefabricated and designed with a structure that has sufficient integrity to sustain its connection with the building frame under high wind loads.

Accordingly, in one embodiment of the invention, there is provided a prefabricated integrated fiber cement and foam insulation panel comprising: a fiber cement layer having a front side and a back side spaced apart to define an intermediate portion and an edge member extending around the intermediate portion; a foam layer having a front side and a back side spaced apart to define an intermediate portion and an edge member extending around the intermediate portion; and an adhesive layer disposed between the fiber cement layer and the foam layer, said adhesive layer adapted to attach the fiber cement layer to the foam layer.

In a further embodiment of the invention, the foam layer is configured to facilitate alignment and assembly of multiple panels together. In one implementation, the foam layer is profiled with an interlocking feature such that adjacent foam layers will interlock when the siding panels are installed. This interlocking feature facilitates alignment of the siding panels, inhibits the infiltration of air and water between the panels and also increases wind loads on the structure by improving the resistance of the panels to the effects of strong winds impinging on the wall.

Accordingly, in a further embodiment of the invention, there is provided an exterior cladding system for building structures. The system comprises a first panel and a second panel, wherein each panel comprises a fiber cement layer and a foam layer, the fiber cement layer of each panel being secured to the respective foam layer, the foam layer of each panel comprises interlocking means. In one embodiment of the invention the interlocking means comprises a receiving channel or mating channel whereby the receiving channel or mating channel of the foam layer of the first panel engages with the receiving channel or mating channel of the foam layer of the second panel when the first and second panel are placed in a contiguous arrangement such that at least a portion of the receiving or mating channel of each of the foam layers abut in an interlocking arrangement.

In a further embodiment of the invention the fibre cement layer is secured to the foam layer by means of an adhesive layer. It is to be understood that any other suitable type of securing means known to a person skilled in the art could also be used. Preferably the method of securing the fibre cement layer to the foam layer allows for thermal, cyclic differential expansion between the fibre cement layer and the foam layer and or any other layers which may be present.

Accordingly, in a further embodiment of the invention, there is provided an exterior cladding system for building structures. The system comprises a first panel and a second panel, wherein each panel comprises a fiber cement layer and a foam layer, wherein the fiber cement layer of each panel is pre-attached to the respective foam layer by an adhesive selected to accommodate the stresses generated by cyclic differential expansion between the fiber cement layer and the foam layer, wherein the foam layer of the first panel comprises an elongate mating channel defined by two opposing sidewalls formed along a longitudinal edge of the foam layer of the first panel, wherein, the foam layer of the second panel comprises an elongate protrusion formed along a longitudinal edge of the foam layer of the second panel, the protrusion on the foam layer of the second panel being configured to be received into the mating channel on the foam layer of the first panel in a manner such that the sidewalls formed on the foam layer of the first panel enclose the protrusion formed on the foam layer of the second panel in a manner such that the foam layer of the first and second panels interlock.

In a further embodiment of the invention, the fiber cement layer is configured to facilitate alignment and assembly of multiple panels together. In one implementation, the fiber cement layer is profiled with an interlocking feature such that adjacent fiber cement layers will interlock when the siding panels are installed. It is to be understood that in other embodiments of the invention the foam layer of the exterior cladding system can be configured such that the interlocking means is located on any two opposing edges of the foam layer. In an alternative embodiment of the invention the interlocking means can be located on at least two opposing edges of the foam layer.

Conveniently in a further embodiment of the invention, the foam layer comprises an interlocking feature extending around at least a portion of the edge member to facilitate alignment and assembly of the multiple panels together. In a further embodiment of the invention, the interlocking feature is configured to improve the wind load of the installed prefabricated integrated fiber cement and foam insulation panel. In one embodiment of the invention, the interlocking feature comprises complementary shaped tongue or groove configurations. In a further embodiment of the invention, the foam layer is configured to interlock with adjacent foam layers in a manner such that the integrated fiber cement and foam insulation panels are arranged in a nested configuration.

In yet another application, the integrated fiber cement and foam system provides foam backed siding planks that provide the functional equivalent of continuous insulation and a thermal break across the framing members. In yet another embodiment, the integrated fiber cement and foam system is configured to form a substantial air seal between the individual components of the system. In yet another arrangement, the integrated fiber cement and foam system provides a foamed back lap or panel siding that allows the installer the flexibility to adjust the joints between individual laps or panels and yet maintain a sealed air barrier. In yet another application, the integrated fiber cement and foam system is designed to aid in the placement of fasteners.

In yet another arrangement, the integrated fiber cement and foam system is designed with a continuous, uninterrupted drainage plane and can prevent water from being trapped between the foam layer and wall sheathing which normally surrounds the structural support of the building structure. In one embodiment of the invention, either the foam layer or the fiber cement layer is configured with one or more drainage channels to provide a drainage plane. In other implementations, drainage channels are formed either on the interior or exterior surface of the foam layer or within the foam layer itself for effective water management within the wall cavities. In a further embodiment of the invention, a plurality of drainage channels are formed in the foam layer of the integrated fiber cement and foam insulation panel. In a further embodiment of the invention, a plurality of drainage channels are formed on at least one of the surfaces of the foam layer of the integrated fiber cement and foam insulation panel. In a further embodiment of the invention, a plurality of drainage channels are formed inside the foam layer of the integrated fiber cement and foam insulation panel. In a further embodiment of the invention, a plurality of drainage channels are formed on at least one of the surfaces of the fiber cement layer of the integrated fiber cement and foam insulation panel. In a further embodiment of the invention, a plurality of drainage channels are formed inside the fiber cement layer of the integrated fiber cement and foam insulation panel. In a further embodiment of the invention the integrated fiber cement and foam insulation panel, at least one surface of the foam layer is provided with a pattern which provides a series of drainage channels in the integrated fiber cement and foam insulation panel. The pattern can adopt any suitable form, for example, a Chevron pattern or a plurality of repeating emblems or logos. In a further embodiment of the invention the foam layer is porous. Conveniently, the foam layer is sufficiently porous to permit water drainage.

In a further embodiment of the invention, the integrated fiber cement and foam insulation panel comprises a fiber cement layer and a foam layer, wherein the width of the foam layer is smaller than the width of the fiber cement panel so as to form an overhang on the integrated fiber cement and foam insulation panel.

In a further embodiment of the invention, the integrated fiber cement and foam insulation panel further comprises a reinforcement mesh layer. In one embodiment of the invention, the integrated fiber cement and foam insulation panel further comprises a reinforcement mesh layer embedded in said foam layer. In a further embodiment of the invention, the integrated fiber cement layer and foam insulation panel further comprises a reinforcement mesh layer intermediate the fiber cement layer and the foam insulation layer. In a further embodiment of the invention, the integrated fiber cement layer and foam insulation panel further comprises a reinforcement mesh layer embedded in the fiber cement layer, intermediate the fibre cement layer and the foam insulation layer. In a further embodiment of the invention, the integrated fiber cement and foam insulation panel further comprises one or more fastening tabs. In a further embodiment, the one or more fastening tabs are disposed between the foam layer and the fiber cement layer. In another embodiment, the one or more fastening tabs are disposed on and/or adjacent to the back side of the foam layer. In a further embodiment, the one or more fastening tabs are attached to the panel in a manner such that a portion of each tab extends outwardly from the lateral edges of the foam layer.

In an embodiment, a method of installing integrated fiber cement and foam insulation panels on a building structure having a framing comprises the steps of: installing one or more starter strips at the base of a wall of the building to form a plank angle; and installing the fiber cement and foam insulation panels sequentially up the wall. In an embodiment, the method further comprises the steps of crotchedly vertically nesting the fiber cement and foam insulation panels. In an embodiment, the method further comprises the steps of installing an insert behind a butt joint intersection between adjacent fiber cement and foam insulation panels; wherein the insert comprises a foam layer with the same profile as a foam layer in the fiber cement and foam insulation panels as a flashing layer. In a further embodiment, wherein the fiber cement and foam insulation panel comprises one or more fastening tabs, the method further comprises the steps of installing the panels to the framing by attaching the one or more fastening tabs to the framing, wherein the fastening tabs are attached to the fiber cement and foam insulation panels in such a manner that at least a portion of each fastening tab is concealed from view when the panels are installed on the building structure.

In yet another application, the integrated fiber cement and foam system is configured to be stacked in a manner during transit so as to reduce damage normally sustained by foam materials while in transit.

In some embodiments, the integrated fiber cement and foam insulation system comprises a prefabricated fiber cement and foam insulation siding panel. The prefabricated panel includes a fiber cement layer and a foam layer attached thereto, preferably by an adhesive. The fiber cement layer can be a panel, a plank, a shingle, a strip, a trim board, or the like. In a further embodiment of the invention the fiber cement and foam insulation siding panel comprises an oriented strand board (OSB), said OSB is attached to the foam layer on the opposing side of the fiber cement layer. Various embodiments of the integrated fiber cement and foam insulation system will be described in greater detail below.

DETAILED DESCRIPTION OF THE PREFERRED EMBODIMENT

Figure 1A:
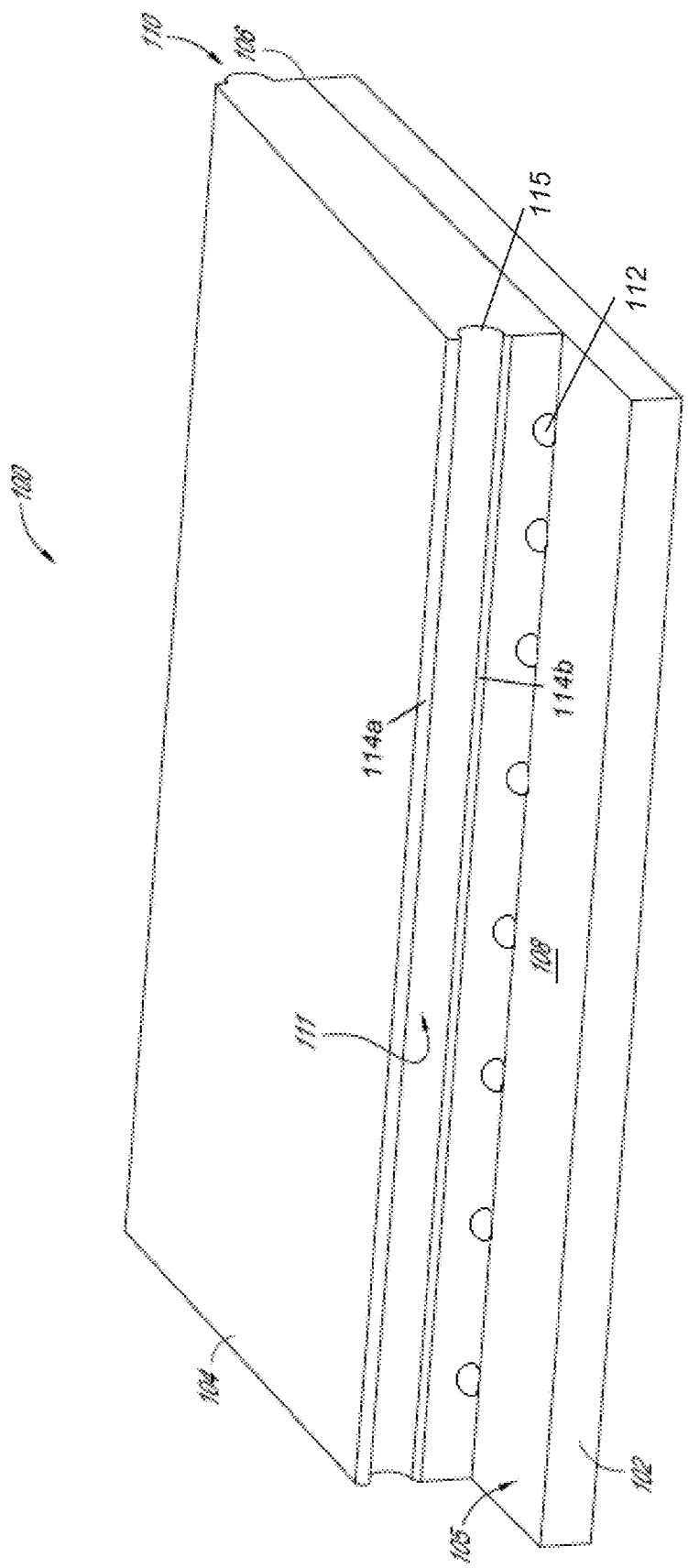
FIGS. 1A-1B illustrate an integrated fiber cement foam and insulation siding panel according to one embodiment of the present disclosure.

References will now be made to the drawings wherein like numerals refer to like parts throughout. FIG. 1A illustrates an integrated fiber cement and foam insulation panel 100 configured for exterior siding applications in accordance with various embodiments of the present disclosure. The panel 100 generally includes a fiber cement layer 102 and a profiled foam layer 104 attached thereto. The fiber cement layer 102 can be in the form of a plank, a siding, a shingle, a strip, a trim board, or various other building components. In a preferred embodiment, the fiber cement layer 102 is configured as a siding used for exterior wall applications. The profiled foam layer 104 can be made of open-celled and/or closed-celled foam or other similar lightweight material with insulating material properties, such as polystyrene foam, mineral based foams, foamed cement or gypsum, phenolic foams, and aerogels. Additionally or alternatively, the profiled foam layer 104 may also comprise mineral fibers or fiberglass, cellulose, polyisocyanurate, polystyrene, polyurethane, cotton fibers, and mineral wool. The profiled foam layer 104 may also include as part of its formulation water repellent agents, fire retarding agents, termiticides, insecticides or repellents, gases that enhance R-value retention, fillers that enhance R-value and the like. In some embodiments, the profiled foam layer 104 may be a composite foam comprised of materials with differential composition, density, compressive strength or fastener holding ability. As shown in FIG. 1A, the profiled foam layer 104 is adhered to an interior surface or backside 105 of the fiber cement layer 102 and extend substantially across the length of the fiber cement layer 102 such that the profiled foam layer can provide continuous insulation and thermal break across between the fiber cement layer and framing members upon installation of the panel 100. Preferably, the profiled foam layer 104 extends partially across the width of the fiber cement layer 102 so as to leave an overhang portion 108. The overhang portion 108 is adapted to overlap with adjacent panels when the panels are installed in a nesting configuration. In other embodiments, the profiled foam layer 104 does not extend across the entire length of the fiber cement layer 102 so as to accommodate possible expansion of the foam due to thermal effects upon installation of the panel 100.

In various embodiments, a specially formulated adhesive layer 106 is uniformly disposed between the interior surface 105 of the fiber cement layer 102 and the profiled foam layer 104 to form a strong and uniform bond between the foam and the fiber cement across the entire panel 100. The adhesive layer 106 is preferably formulated to establish an effective chemical and/or mechanical interlocking bond with both the foam and the fiber cement. In one embodiment, the adhesive layer 106 may be made of polyurethane, poly urea or isocyanate based materials. Preferably, the adhesive layer when bonding styrene foam to fiber cement is a high-shear strength adhesive that will not attack or eat away at either the fiber cement or styrene foam. Preferably, the adhesive layer will offer a durable bond between the fiber cement and foam layers in a variety of environmental condition including cold and warm conditions, dry and wet conditions, and freeze-thaw conditions, with salt, and in alkaline solutions, etc. The adhesive layer also preferably maintains its adhesive properties through exposure to many cycles of temperature swings (hot to cold), moisture conditions (wet to dry), and/or freeze-thaw cycles.

In one embodiment, the adhesive layer can be made of a water based adhesive, solvent based adhesive, and 100% solid. The adhesive layer can be formed in a liquid form, in, a paste form, and/or in a solid form as hot melt adhesive. The chemistries can include one and two component polyurethane, one and two part epoxy, polyvinyl acetate, polyolefin, amorphous polyolefin, pressure sensitive polyolefin, poly ethylene vinyl acetate, and/or polyamide. In some embodiments, the adhesive may be a hot melt or reactive hot melt adhesive. In such embodiments, it is preferable that the hot melt adhesive establishes a very quick bond so that the fiber cement product bonded with foam can be moved and stacked in production.

In a preferred embodiment, the adhesive layer 106 is selected to accommodate the possible stresses generated by cyclic differential expansion between the foam and the fiber cement portions of the integrated fiber cement and foam insulation panel. In various embodiments, the adhesive can be applied onto the fiber cement layer by spraying, roll coating, etc. The adhesive layer 106 may be discontinuous, such as with partial coverage over the portion of the back surface 105 of the fiber cement layer 102 which mates to the profiled foam layer 104 to lead to a material and cost savings. A discontinuous adhesive layer 106 may also facilitate the evaporation of moisture from the interface between the elongate fiber cement layer 102 and the profiled foam layer 104. In other embodiments, the adhesive layer 106 may be continuous, such as with full coverage over the portion of the back surface 105 of the fiber cement layer 102 which mates to the profiled foam layer 104.

In another embodiment, the profiled foam layer 104 may be joined to the fiber cement layer 102 by laminating the profiled foam layer 104 to the interior surface or back face 105 of the fiber cement layer 102. Lamination may be achieved by mechanical means, by use of adhesives or by forming the foam layer directly on the fiber cement layer either before or after curing of the fiber cement layer by autoclaving, depending on the materials used. In yet another embodiment, the profiled foam layer 104 can be formed by applying a layer of foam generating liquid to the interior surface or back face 105 of the fiber cement layer 102 and allowing the layer of foam generating liquid to expand such that the entire interior surface or back face 105 of the fiber cement layer 102 is substantially covered with foam. In this embodiment, the profiled foam layer 104 may be formed into a predetermined shape and profile after foam generation by use of routing, molding or machining equipment as is known to those skilled in the art. Alternatively, the profiled foam layer 104 may be formed by allowing the layer of foam generating material to expand into a mold or container of a predetermined shape or profile, followed by an operation that releases the foam layer from the mold or container.

With further reference to FIG. 1A, in various preferred embodiments, the profiled foam layer 104 can include drainage channels 112 extending through the exterior or interior of the foam to provide water drainage. The profiled foam layer 104 can also include profiled opposing longitudinal edges 110, 111. The profiled edges 110, 111 are configured to interlock with corresponding profiled edges on adjacent profiled foam layers to facilitate alignment of the panels 100 during installation. In certain implementations, the interlocking features formed by the edges 110, 111 of the profiled foam layer 104 are adapted to allow the panels 100 to nest with each other as they are assembled on a wall.

As described in greater detail below, in some embodiments, the interlocking features are specially configured to interlock in a manner that improves the wind load of the panels. As shown in FIG. 1A, one of the edges 111 of the profiled foam layer 104 is configured with a channel 115 defined by two parallel sidewalls 114a, 114b extending longitudinally across the edge 111. The parallel sidewalls 114a, 114b in conjunction with the channel 115 formed in the profiled foam layer 104 interlock and secure the edge 110 of adjacent foam layers so as to improve wind resistance of the panel 100. The interlocking features can also be adapted to provide an air seal, whether with or without use of sealants such as caulk or tape. In some embodiments, the interlocking feature can also be adapted to meet the requirements for continuous insulation and thermal break across the framing members. In some implementations, the interlocking features are also adapted to provide the installer a means to adjust joint spacing so as to efficiently space panels along the wall to reduce material use and installation labor.

Figure 1B:
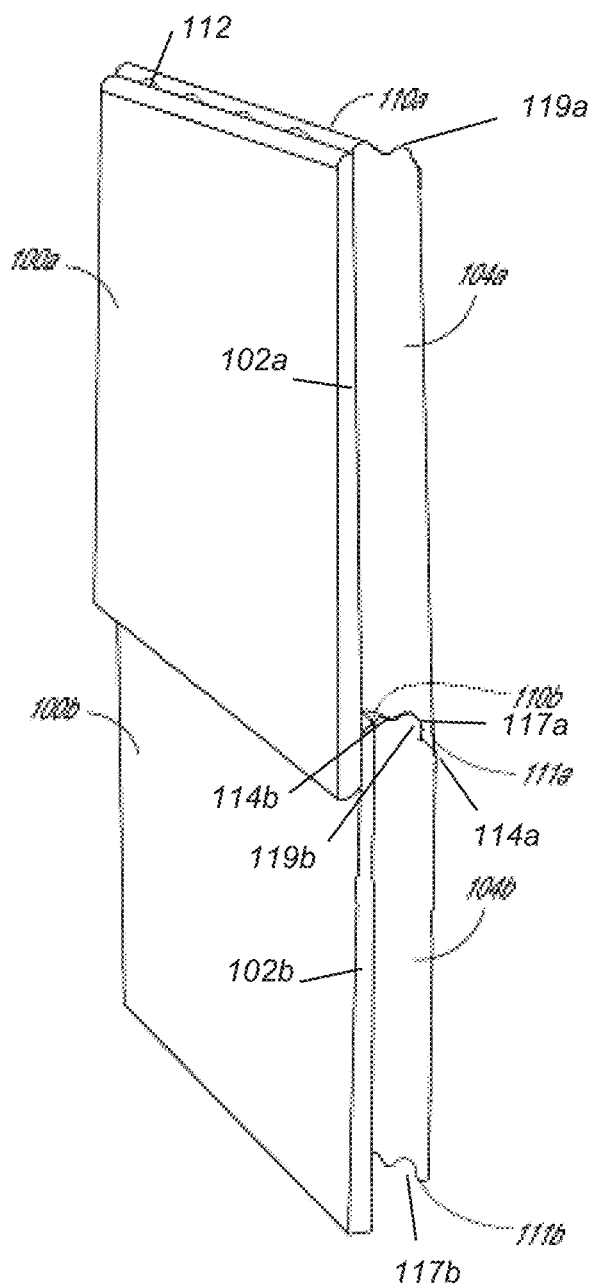

FIG. 1B illustrates a manner in which a plurality of integrated fiber cement and foam insulation panels 100a, 100b can be arranged as assembled on a building frame to form an exterior cladding, such as for exterior siding applications. In various preferred embodiments, the panels 100a, 100b are prefabricated so that the installer can simply remove the packaging from each panel and attach the panels to the frame of a building. As shown in FIG. 1B, the panels 100a, 100b are positioned in a nesting configuration whereby the profiled edges 110a, 111a, 110b, 111b of the foam layers 104a, 104b interlock the panels so as to provide an air seal without sealer and to facilitate alignment and installation. The panels can be positioned such that the interlocking foam layers can provide continuous insulation and thermal break across the building framing members. As also shown in FIG. 1B, the drainage channels 112 allow water to drain from the interior of the panels 100a, 100b. The drainage channels 112 can be formed either on the interior or exterior surface of the foam layer or within the foam layer itself for effective water management within the wall cavities. In one implementation, the profiled foam layer 104 has a thickness of about ¼ inch to 3 inches (0.635 cm to 7.62 cm) and the fiber cement layer 102 has a thickness of about ⅛ inch to 1.25 inches (0.318 cm to 3.175 cm). In one embodiment, the profiled foam layer 104 can have a density of between 1.25 to 2.0, such as 1.25, 1.5, 1.75, or 2.0, and an R value of between R3 and R7, preferably R3, such as R3, R5, and R7.

With further reference to FIG. 1B, in overlapping siding applications, the parallel side walls 114a, 114b on the lower edge 117a of the profiled foam layer 104a directly contact and enclose both side surfaces of the upper edge 119b of the adjacent profiled foam layer 104b, thus mechanically connecting the profiled foam layers 104a, 104b with each other, which in turn improve the wind load of the panels 100a, 100b. In one embodiment, both the upper and lower edges 117a, 117b, 119a, 119b of the profiled foam layers 104a, 104b have a sloped profile such that the parallel side walls 114a, 114b are not evenly disposed. Preferably, the sidewall 114b in contact with the fiber cement layer 102a, 102b is positioned higher than the sidewall 114a, 114b not in direct contact with the fiber cement layer.

Figure 2A:
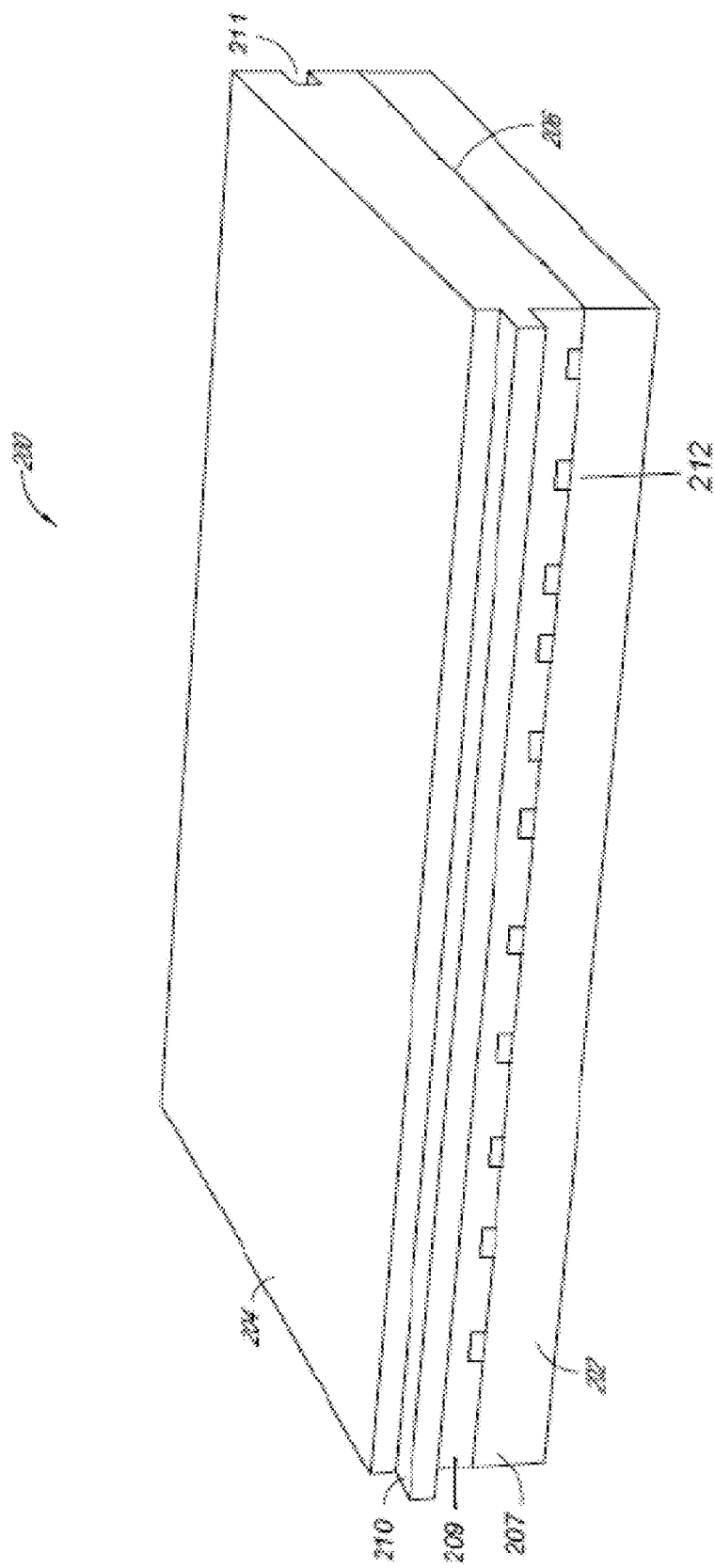
FIGS. 2A-2C illustrate an integrated fiber cement foam and insulation siding panel according to another embodiment of the present disclosure.

FIG. 2A illustrates an, integrated fiber cement foam and insulation panel 200 according to another embodiment of the present disclosure adapted for exterior siding applications in which the sidings are not in a nesting configuration. As shown in FIG. 2A, the panel 200 includes a fiber cement layer 202 and a profiled foam layer 204 attached thereto. The profiled foam layer 204 can be attached to the fiber cement layer 202 by an adhesive layer 206 or can be integrally formed on the fiber cement layer 202. In this embodiment, the longitudinal edge 209 of the profiled foam layer 204 is substantially flush with the longitudinal edges 207 of the fiber cement layer 202. As also shown in FIG. 2A, the foam layer 204 has interlocking features 210, 211 adapted for aligning and coupling adjacent panels 200 during assembly, such as a tongue and groove joint. Additionally, drainage channels 212 can be formed in the foam layer 204 as shown in FIG. 2A. In certain preferred implementations, the thickness of the foam and fiber cement layers can be selected to provide target insulation R values and also allow the panels to be integrated into the building structure without requiring alterations of the wall or framing dimensions of existing building structures. In one implementation, the foam backing 204 has a thickness of about ¼ inch to 3 inches (0.635 cm to 7.62 cm) and the fiber cement layer has a thickness of about ⅛ inch to 1.25 inches (0.318 cm to 3.175 cm). In one embodiment, the foam backing 204 can have a density of between 1.25 to 2.0, such as 1.25, 1.5, 1.75, or 2.0, and can, have an R value of between R3 and R7, preferably R3, such as R3, R5, and R7. In one embodiment, siding nails from 6 d to 16 d can be used, such as 6 d, 10 d, and 16 d.

Figure 2B:
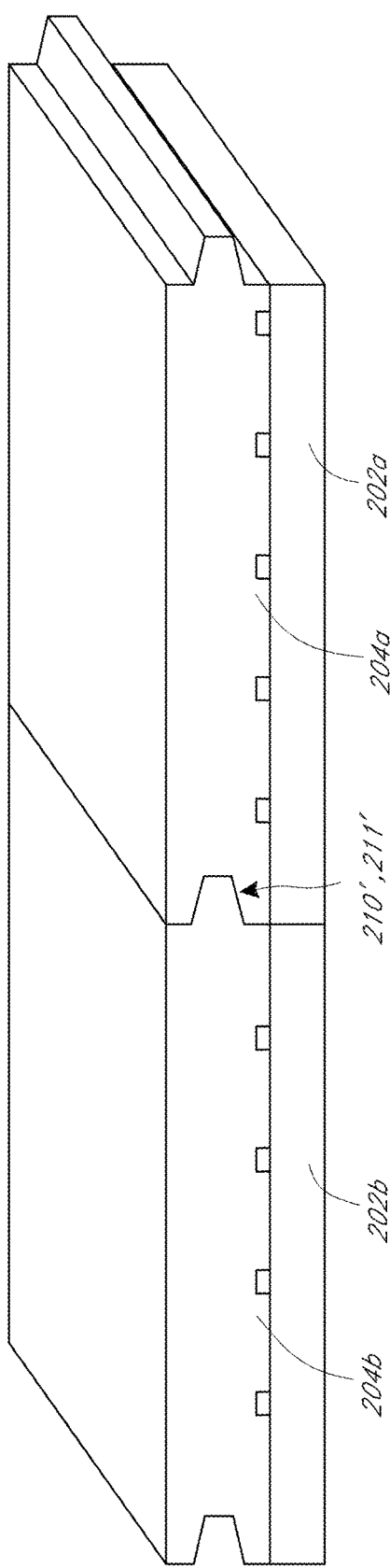

FIG. 2B illustrates one embodiment in which integrated fiber cement and foam insulation panels 200 can be arranged when they are assembled on a building frame to form an exterior cladding. As shown in FIG. 2B, the foam layers 204a, 204b can include interlocking features 210', 211' such as a tongue and groove, such that the fiber cement layers 202a, 202b form a substantially planar exterior surface. In some embodiments, the interlocking features in the foam layers may be formed using the same techniques as for forming drainage channels in a separate step. In addition, in the case of EPS foams, the polystyrene beads may be placed in a mold specifically designed to yield a foam panel having both drainage channels and interlocking features.

Figure 2C:
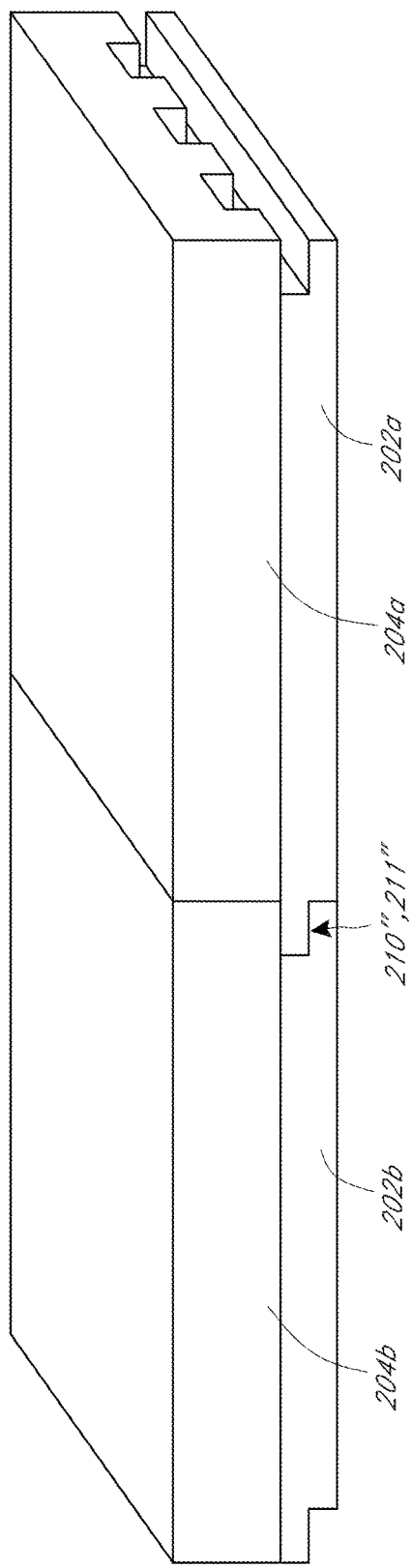

FIG. 2C shows an alternative embodiment in which the integrated fiber cement and foam insulation panels can be arranged when they are assembled on a building frame to form an exterior cladding. As shown in FIG. 2C, the fiber cement layers 202a, 202b can include interlocking features 210", 211" such that the fiber cement layers 202a, 202b form a substantially planar exterior surface. In the illustrated embodiment in FIG. 2C, the profiled foam layers 204a, 204b are configured without interlocking features. It should be appreciated that in various embodiments, either the profiled foam layers 204a, 204b and/or the fiber cement layers 202a, 202b can have interlocking features 210, 211.

In various embodiments, the fiber cement and foam insulation systems disclosed herein are designed with innovative water management mechanisms and improved ventilation functions to facilitate ventilation and drainage of water and other liquids from the wall cavity. As shown in FIG. 1A, the foam layer 104 may incorporate various drainage channels 112. The drainage channels are designed to divert water away from the panels so as to prevent water from entering the home, prevent damage to the panels, and prevent the panels from attracting insects.

FIGS. 3A-3I are schematic illustrations of certain embodiments of the profiled foam layer 104 that is part of the integrated fiber cement foam and insulation panel 100. In some embodiments, the profiled foam layer 104 has a first face 131 that is configured to be in direct contact with a fiber cement panel and an opposing face 133 that is set at an angle relative to the first face 131 so as to form an inclined surface relative to the fiber cement layer. The inclined surface facilitates mounting of the panels in a nesting configuration. In some other embodiments, the profiled foam layer 104 can be configured to allow stacking of the integrated fiber cement and foam panels during transit so as to reduce damage otherwise normally sustained by foam materials while in transit. As illustrated in FIGS. 3A-3D, the profiled foam layer 104 can include complementary angled edges to facilitate nesting. In one embodiment, an angle 134 measuring about 45 degrees relative to the vertical axis can be formed on the upper edge and a complementary angle 136 measuring about 135 degrees relative to the vertical axis can be formed on the lower edge. In some embodiments, the vertical axis can be the vertical axis of the integrated fiber cement and foam panel when the integrated fiber cement and foam panel is positioned or assembled on a building structure. In some other embodiments, the angles 134, 136 can, be 0 to 90 degrees, 90 degrees to 180 degrees, 0 to 45 degrees, 45 degrees to 90 degrees, 90 degrees to 135 degrees.

Figure 3A:
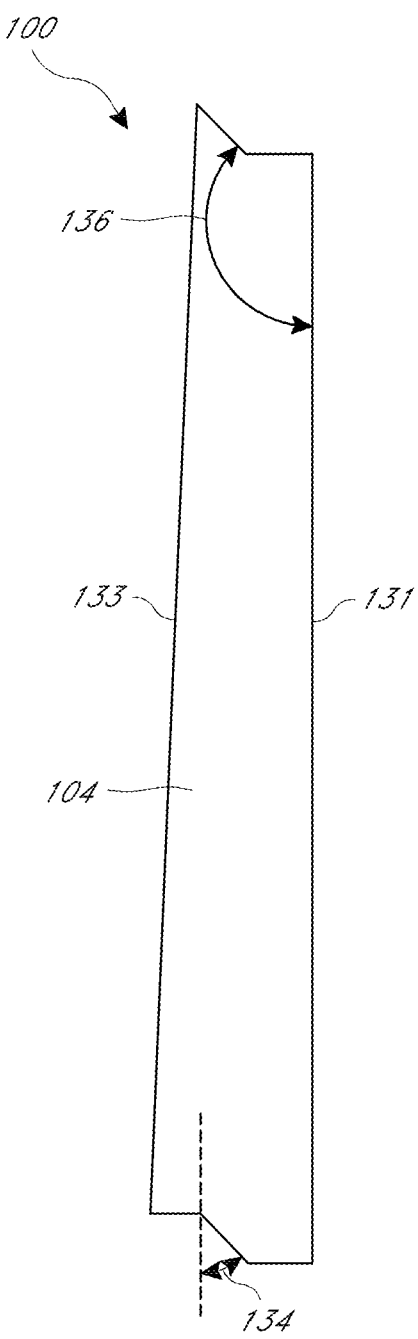
FIGS. 3A-3I illustrate embodiments of foam layer profiles that can be incorporated in an integrated fiber cement and foam insulation panel.
Figure 3B:
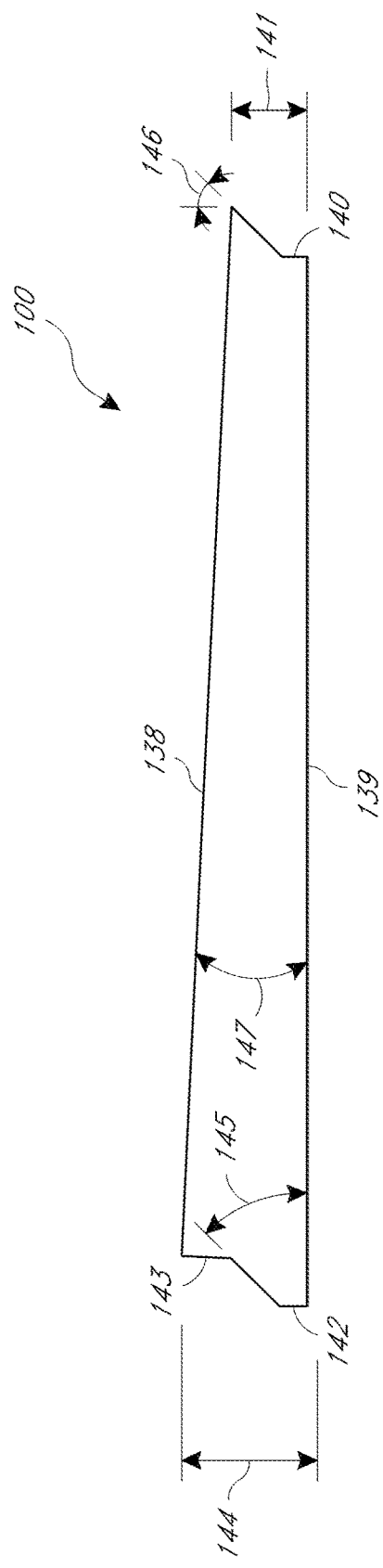

In the embodiment shown in FIG. 3B, side 138 can have a range between 3.5 inches (8.9 cm) to 11 inches (27.9 cm), side 139 can have a range between 3.5 inches to 11 inches (8.9 cm to 27.9 cm), side 140 can have a range between 0.0625 inch to 0.375 inch (0.159 cm to 0.95 cm), side 141 can have a range between 0.25 inch to 1.25 inches (0.635 cm to 3.175 cm), side 142 can have a range between 0.0625 inch to 0.375 inch (0.159 cm to 0.95 cm), side 143 can have a range between 0.0625 inch to 0.375 inch (0.159 cm to 0.375 cm), and side 144 can have a range between 0.75 inch to 1.75 inch (1.91 cm to 4.45 cm). Angle 145 can have a range between 30 degrees to 60 degrees, angle 146 can have a range between 30 degrees to 60 degrees, and angle 147 can have a range between 1.5 degrees to 5.0 degrees.

Figure 3C:
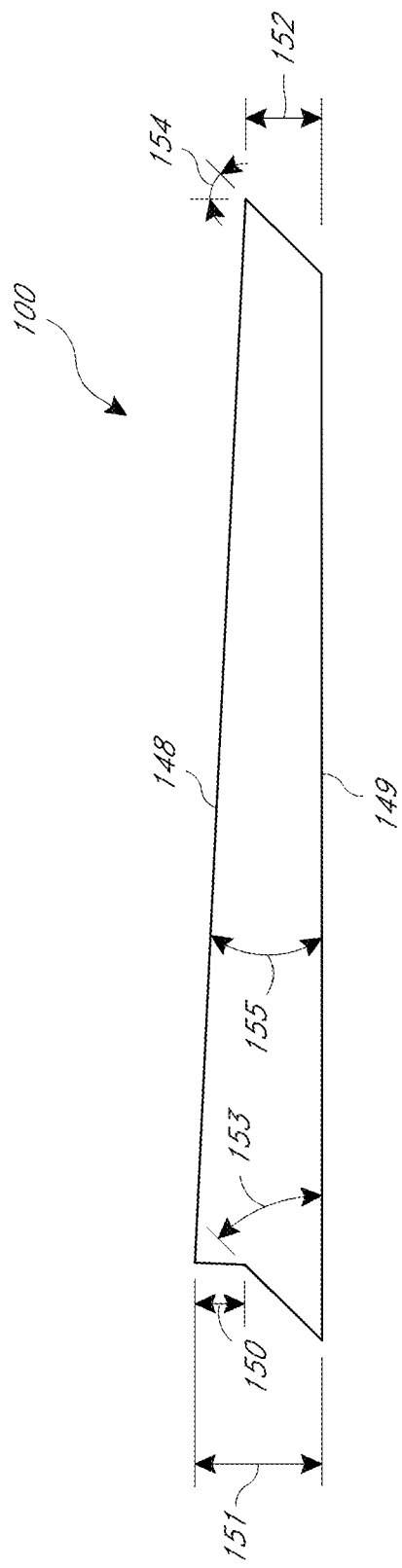

In the embodiment shown in FIG. 3C, side 148 can have a range between 3.5 inches to 11 inches (8.9 cm to 27.9 cm), side 149 can have a range between 3.5 inches to 11 inches (8.9 cm to 27.9 cm), side 150 can have a range between 0.0625 inches to 0.375 inches (0.159 cm to 0.95 cm), side 151 can have a range between 0.625 inches to 1.75 inches (1.59 cm to 4.45 cm), and side 152 can have a range between 0.25 inches to 1.25 inches (0.635 cm to 3.175 cm). Angle 153 can have a range between 30° to 60°, angle 154 can have a range between 30° to 60°, and angle 155 can have a range between 1.5° to 5.0°.

Figure 3D:
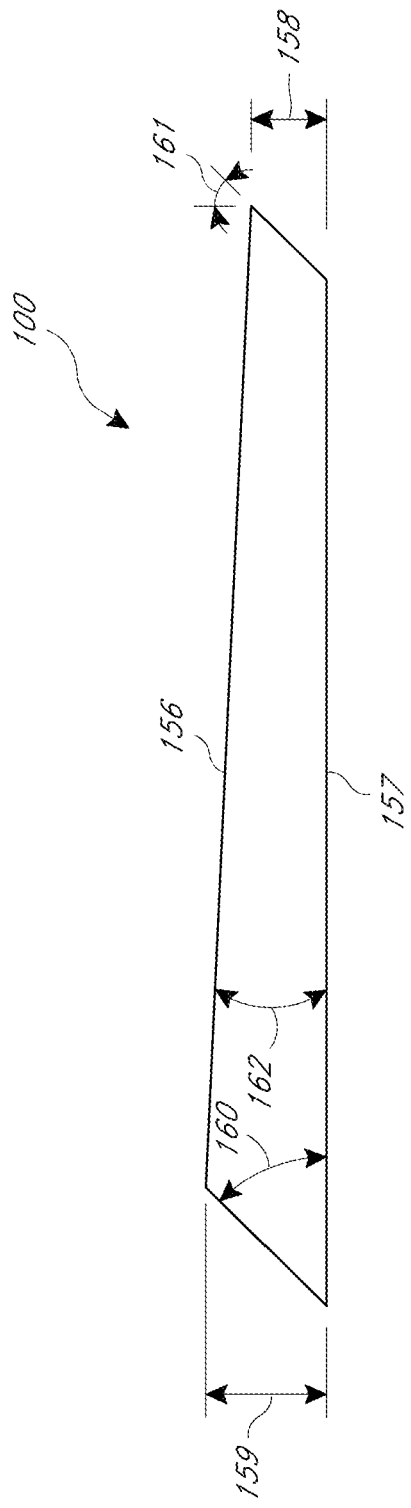
Figure 3E:
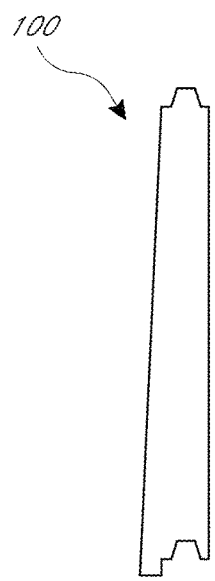
Figure 3F:
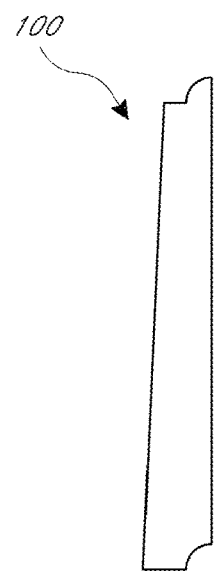
Figure 3G:
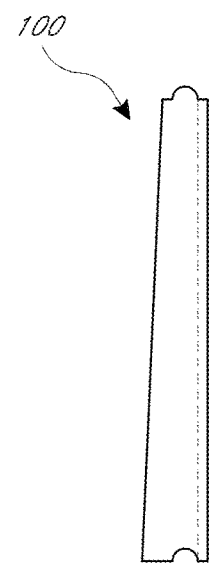
Figure 3H:
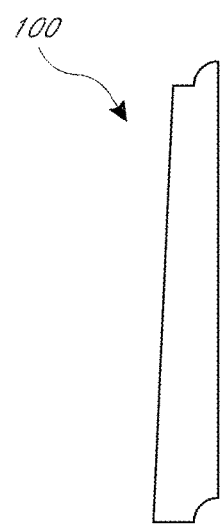
Figure 3I:
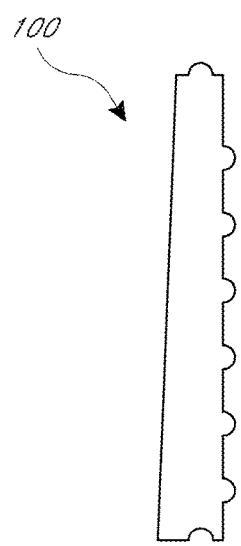

In the embodiment shown in FIG. 3D, side 156 can have a range between 3.5 inches to 11 inches (8.9 cm to 27.9 cm), side 167 can have a range between 3.5 inches to 11 inches (8.9 cm to 27.9 cm), side 158 can have a range between 0.25 inches to 1.25 inches (0.635 cm to 3.175 cm), and side 159 can have a range between 0.625 inches and 1.75 inches (1.59 cm to 4.45 cm). Angle 160 can have a range between 30° to 60°, angle 161 can have a range between 30° to 60°, and angle 162 can have a range between 1.5° to 5.0°.

FIGS. 3E-3I depict additional profiles of foam layers that can be part of the integrated fiber cement foam and insulation panel.

FIGS. 3J-3N depict profiles of foam starter strips that can be placed at the bottom of a wall to start the proper kick out angle for installation of siding going up a wall.

Figure 3J:
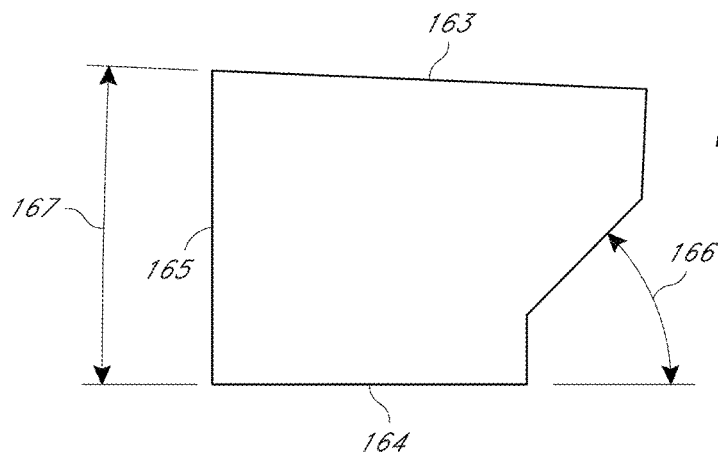
FIGS. 3J-3N illustrate profiles of foam starter strips of various embodiments.

In the embodiment shown in FIG. 3J, side 163 can have a range between 1.0 inches to 1.5 inches (2.54 cm to 3.81 cm), side 164 can have a range between 0.0625 inches to 1.0 inches (0.16 cm to 2.54 cm), and side 165 can have a range between 0.5 inches to 1.5 inches (1.27 cm to 3.81 cm). Angle 166 can have a range between 30° to 60° and angle 167 can have a range between 1.5° to 5.0°.

Figure 3K:
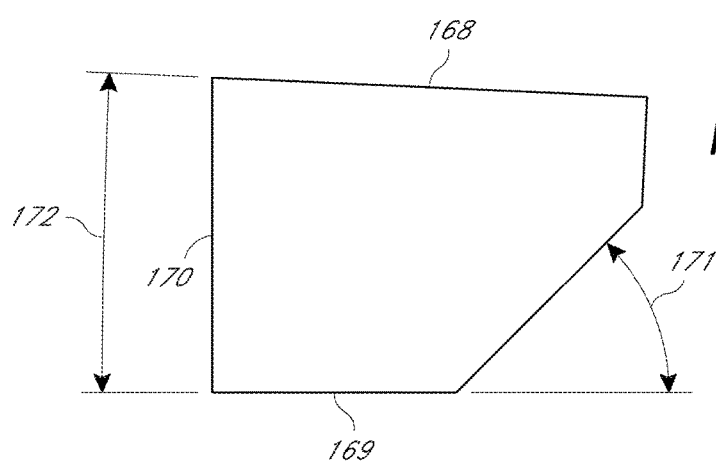

In the embodiment shown in FIG. 3K, side 168 can have a range between 1.0 inches to 1.5 inches (2.54 cm to 3.81 cm), side 169 can have a range between 0.0625 inches to 1.0 inches, (0.159 cm to 2.54 cm) and side 170 can have a range between 0.5 inches to 1.5 inches (1.27 cm to 3.81 cm). Angle 171 can have a range between 30° to 60° and angle 172 can have a range between 1.5° to 5.0°.

Figure 3L:
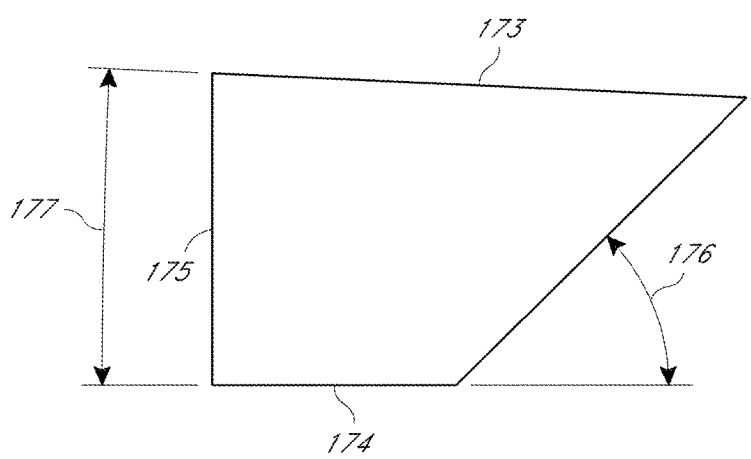
Figure 3M:
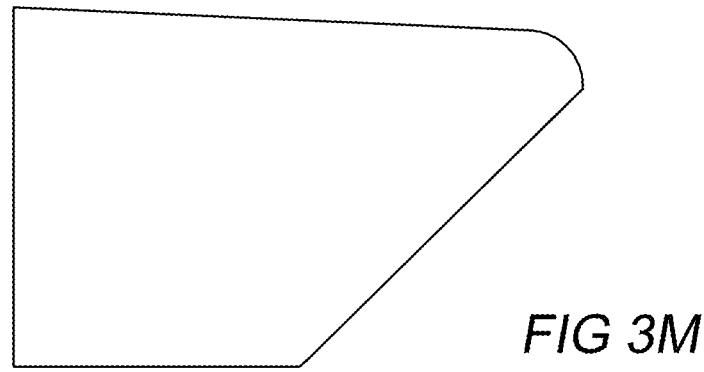
Figure 3N:
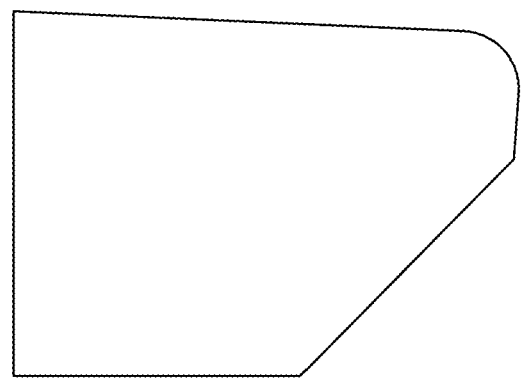
Figure 4A:
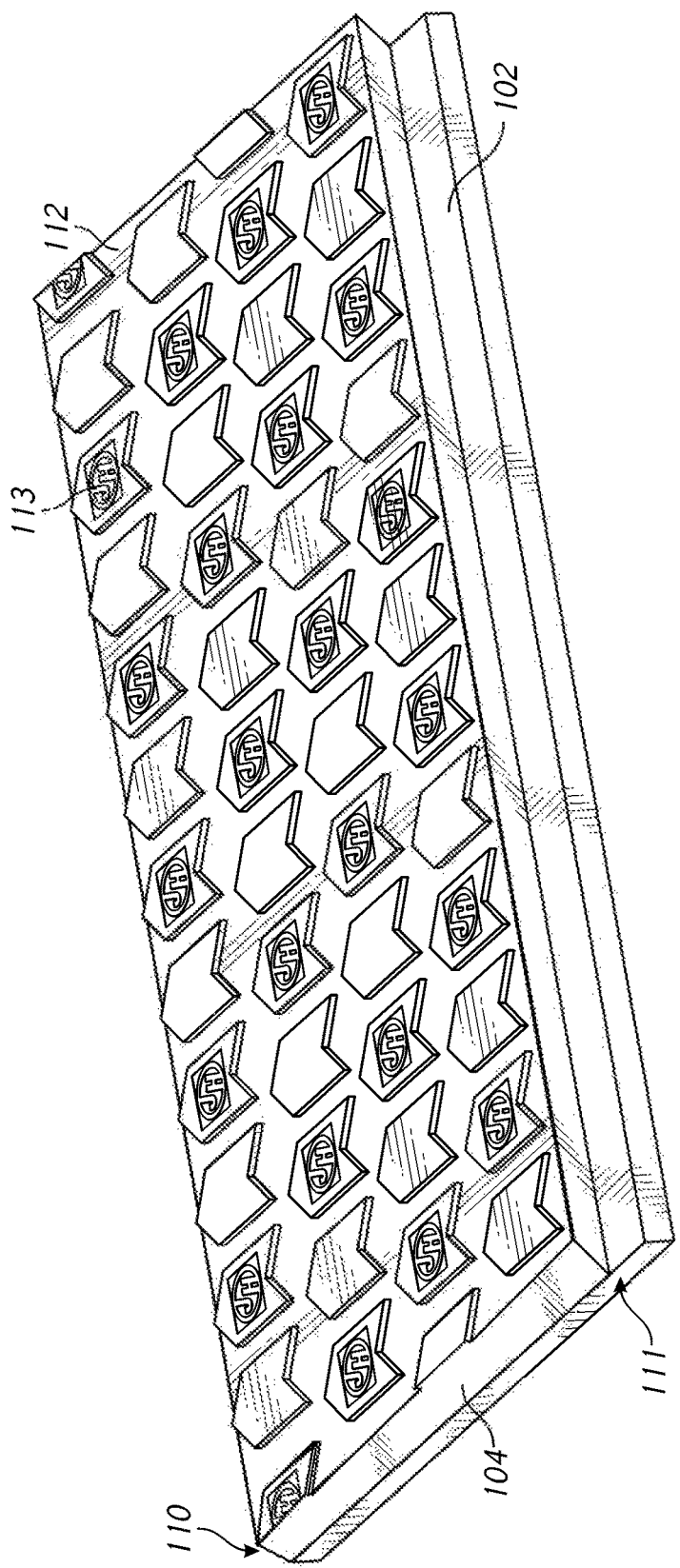
FIG. 4A-4D illustrates an embodiment of integrated fiber cement and foam insulation panels incorporating drainage features of various embodiments.
Figure 4B:
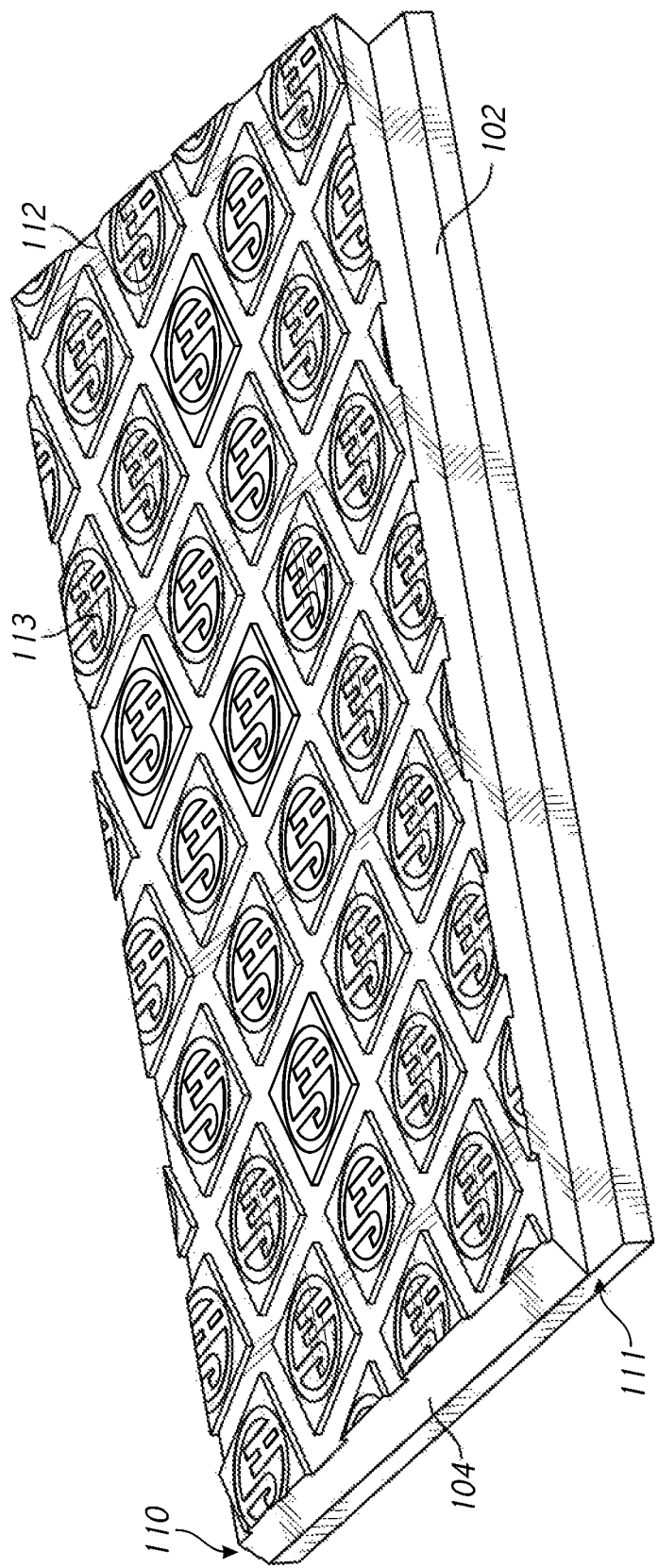
Figure 4C:
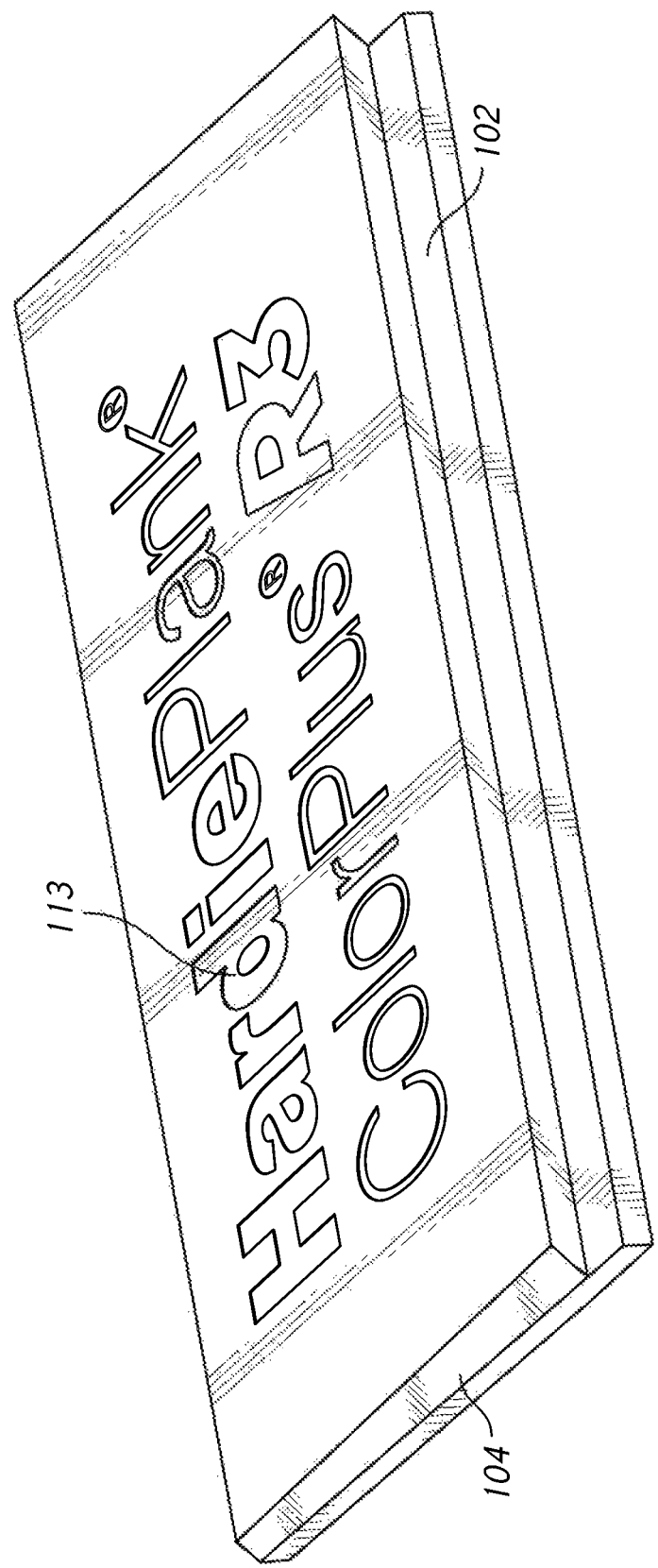
Figure 4D:
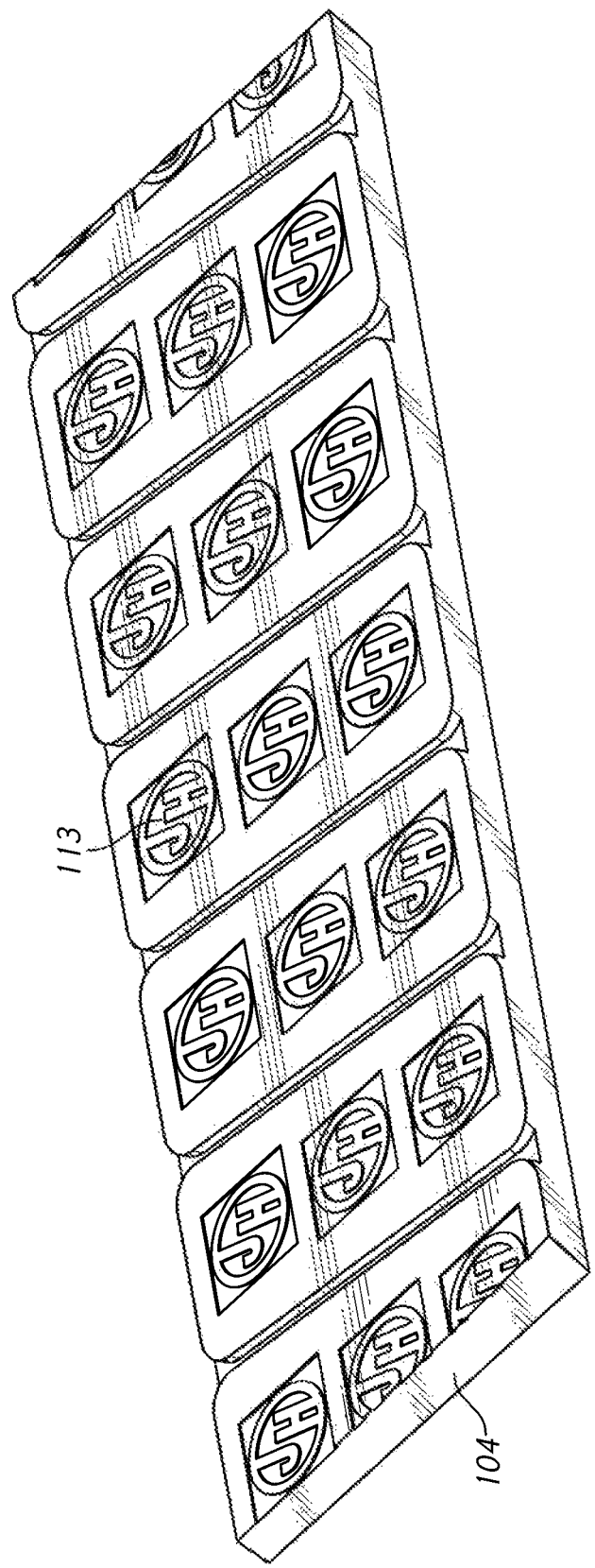

In the embodiment shown in FIG. 3L, side 173 can have a range between 1.0 inches to 1.5 inches (0.159 cm to 2.54 cm), side 174 can have a range between 0.0625 inches to 1.0 inches (0.159 cm to 2.54 cm), and side 175 can have a range between 0.5 inches to 1.5 inches (1.27 cm to 3.81 cm). Angle 176 can have a range between 30° to 60° and angle 177 can have a range between 1.5° to 5.0°.

In various embodiments, the fiber cement and foam insulation panels disclosed herein are designed with innovative water management mechanisms to facilitate ventilation and drainage of water and other liquids from the wall cavity. With reference to FIGS. 4A-4D, in various embodiments, the drainage channels may take on a variety of patterns including grooves, designs or logos 113. As depicted in the illustrated embodiments, the drainage channel patterns are formed on the back side of the foam layer 104. However, it should be appreciated that in various embodiments, the drainage channels 112 and grooves, designs or logos 113 may be formed along any surface of the foam, or in other embodiments, through the thickness of the foam. The drainage channels, can be made by machining or hot wire cutting or a spindle molder with aluminum blades. The channels or features may also be formed using molding techniques such as injection molding. In alternative embodiments, the drainage channels 112 can take the form of an embossed or debossed feature in the form such as an image, symbol, design or logo. In another embodiment, the drainage channels can take the form of chevrons or tread designs. In some embodiments wherein thermoplastic foams, such as polystyrene foams, are used, the drainage channels 112 may be added by machining using a router or grinder or by using a hot wire, water jet cutting or laser cutting means. In the case of thermosetting foams, water channel routing, grinding, or injection molding techniques may be preferred. In yet other embodiments, such as foams made out of expanded polystyrene (EPS), the drainage channels may be incorporated into the mold used to form the foam. In other embodiments, such as foams made out of cut block EPS foam, the porosity of the foam can function as the drainage channels or to improve ventilation. In such embodiments, the foam porosity can be adjusted to allow drainage. As such, the foam according to some embodiments of the present disclosure may not require drainage channels.

Figure 5:
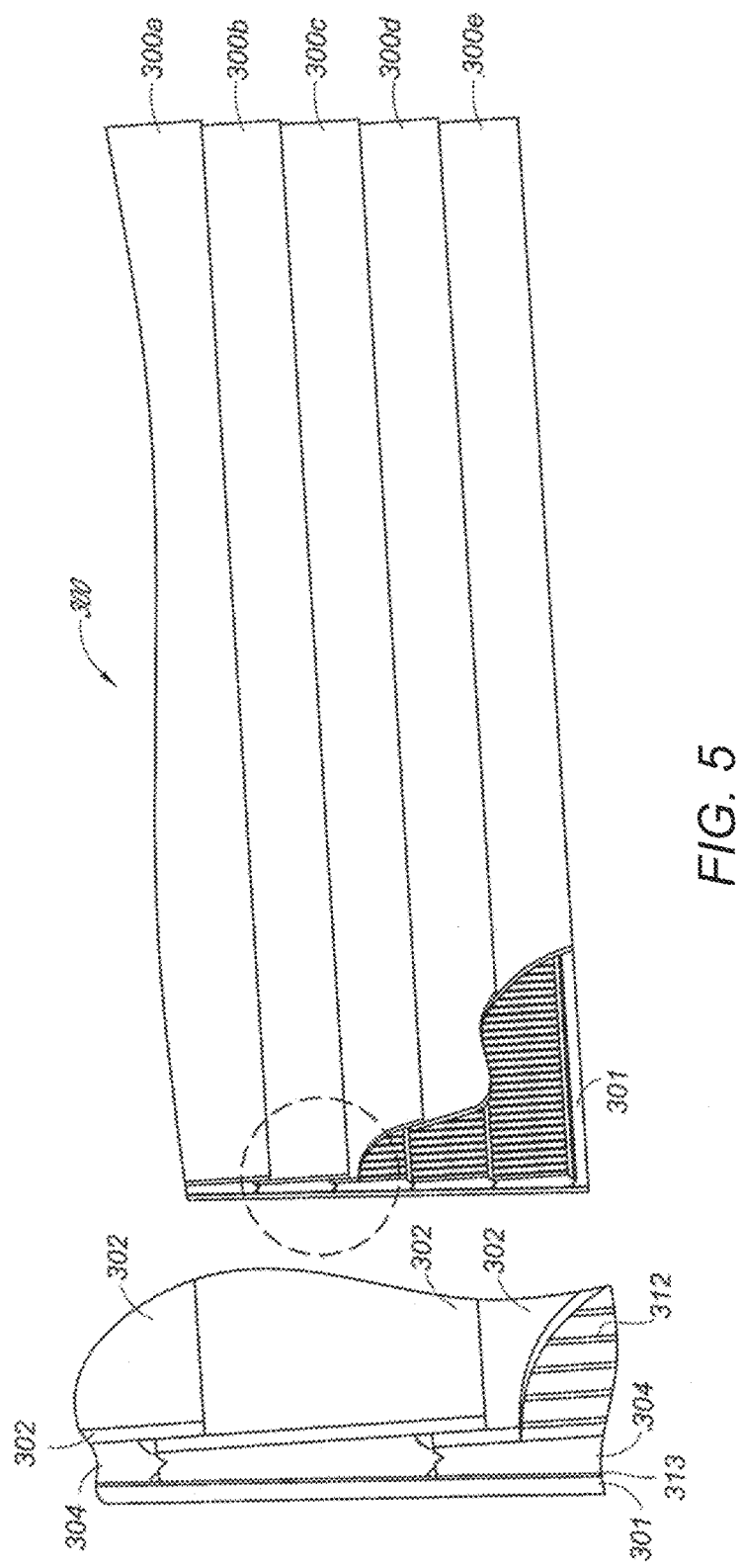
FIG. 5 illustrates an integrated wall assembly according to one embodiment of the present disclosure.

FIG. 5 illustrates an integrated wall assembly 300 according to one embodiment of the present disclosure. The wall assembly 300 can include a sheathing 301, such as oriented strand board (OSB), and a plurality of prefabricated fiber cement and foam insulation panels 300 *a-e* mounted to the sheathing 301. The foam layer 304 on each panel interlocks with the foam layer on adjacent panels such that the fiber cement layers 302 are aligned in a nested configuration. In the embodiment shown in FIG. 5, water draining channels 312 are formed on the front surface of the foam layer. In some embodiments, the drainage channels 312 can be formed on the back surface of the foam layer 304, within the interior foam layer, or a combination of the front, back surface and/or interior of the foam layer. In other embodiments, the drainage channels may be formed on the back face of the fiber cement layer 302. In yet other embodiments, the drainage channels may be formed in both the foam layer and the fiber cement layers. In some implementations, a layer of weather resistant barrier material 313, such as those marketed under the HardieWrap® brand, can be positioned between the sheathing 301 and the foam layer 304 of the fiber cement and foam insulation panel 300*a*-300*e*.

Figure 6A:
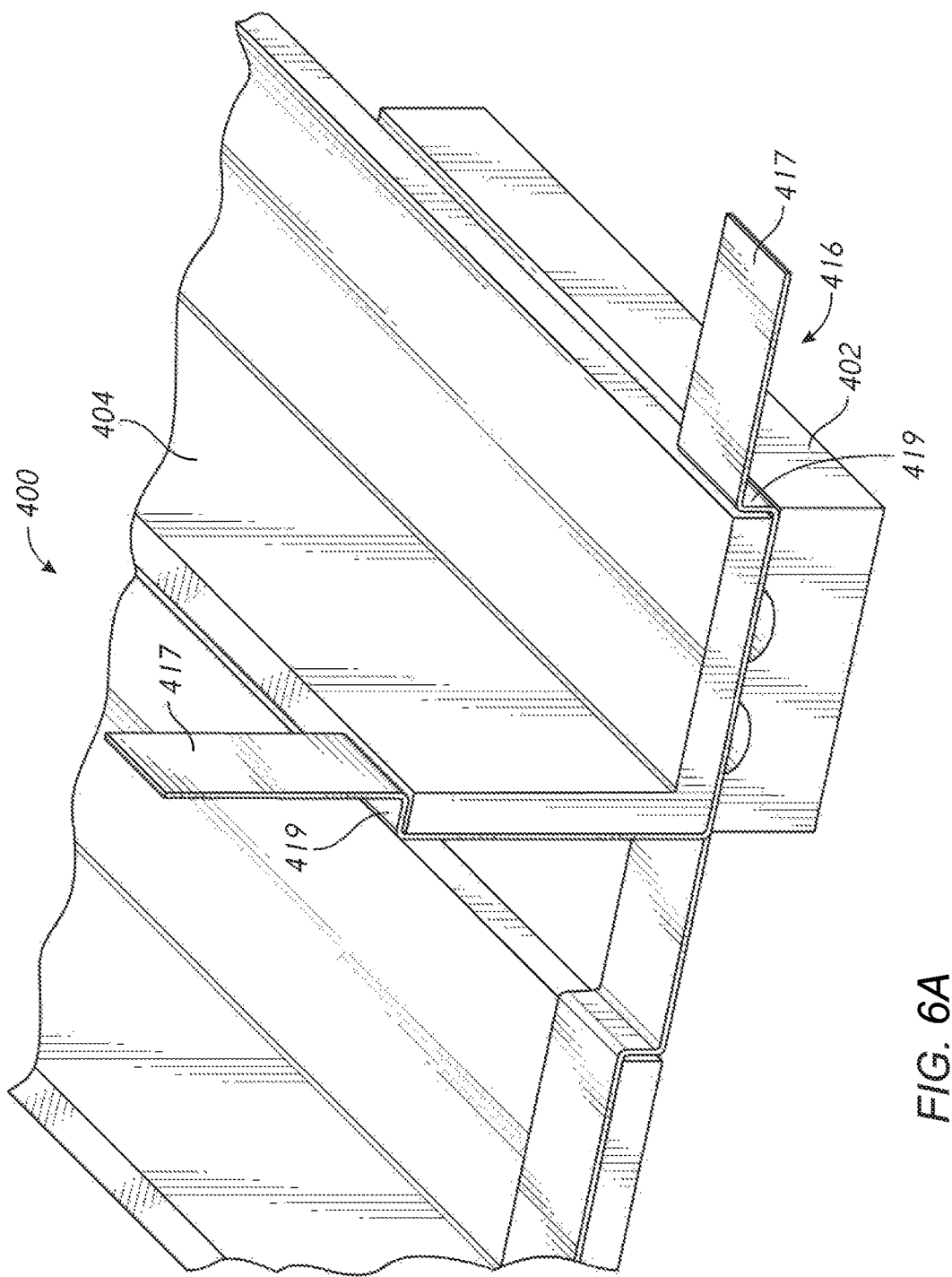
FIG. 6A-6I illustrate various embodiments of an integrated fiber cement and foam insulation panel with integrated fastening tabs.
Figure 6B:
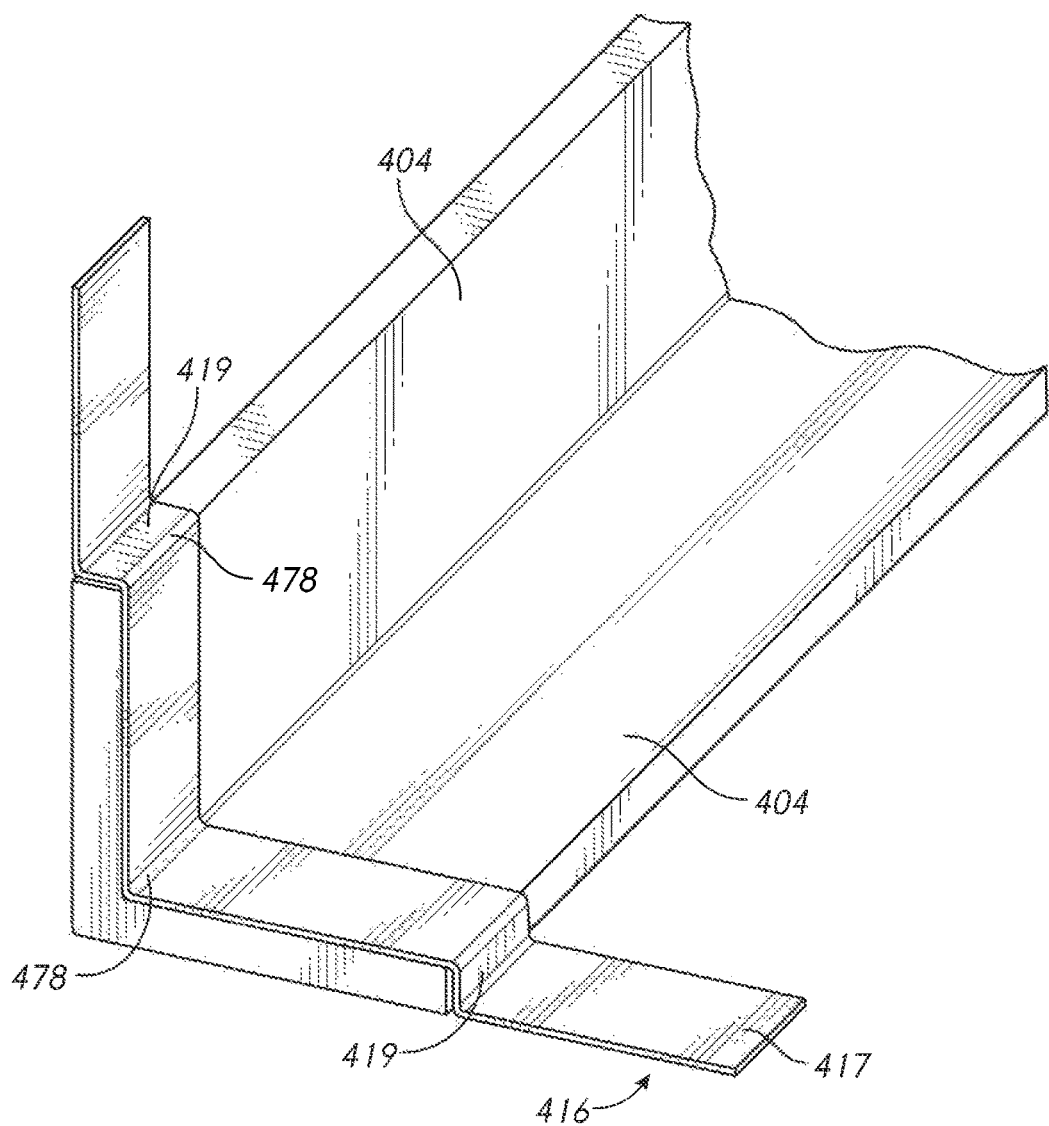

FIG. 6A illustrates an embodiment of a fiber cement and foam insulation trim corner 400 with an integrated fastening tab 416. The trim corner 400 with the fastening tab 416 is for use around an outside corner of a building structure. FIG. 6B illustrates an embodiment of a foam insulation panel with an integrated fastening tab for use around an inside corner of a building structure. The fastening tabs 416 are configured for mounting the fiber cement and foam insulation trim corner to the building frame or other support structure without having to attach a fastener through the front face of the fiber cement layer 402. As such, the fastening tabs 416 can be used so that the fasteners are concealed from view upon installation of the panels. The panels 400 may also be useful in installations where the wall does not include a sheathing to attach the panels. As shown in the illustrated embodiments in FIGS. 6A-6B, in some embodiments, the fastening tabs 416 can have one or more overhanging portions 417 extending outwardly from an edge of the foam layer to fasten to a support structure of a building (e.g., extending from the lateral edges of the foam layer). In one preferred embodiment, the overhanging portions 417 can be between 3-10 inches (7.62 cm-25.4 cm) in length, more preferably approximately 3 inches (7.62 cm) in length.

Figure 6C:
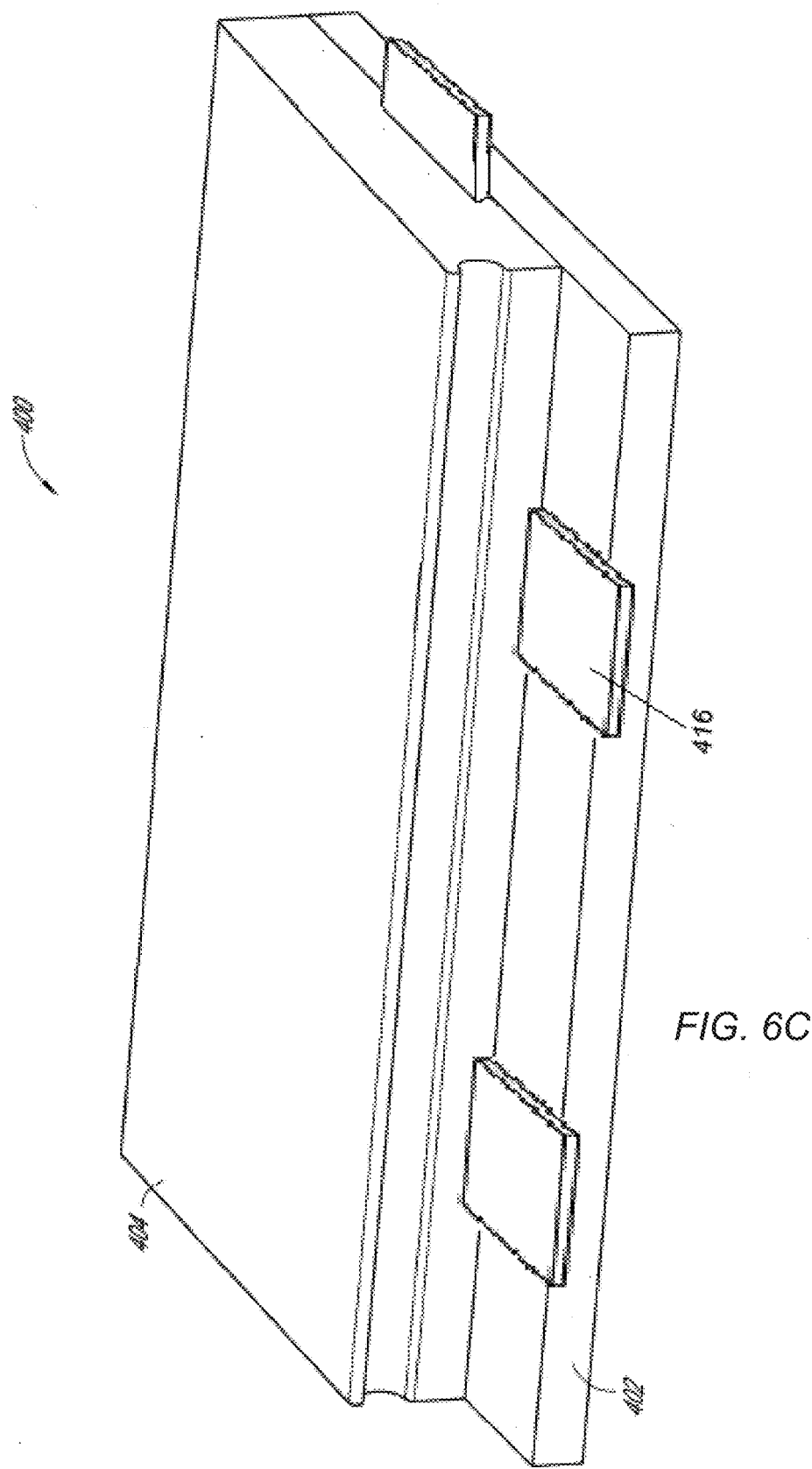

As shown in FIG. 6A and FIG. 6C, in some embodiments, the fastening tabs 416 can be arranged to be disposed between the fiber cement layer 402 and the foam layer 404. In some embodiments, the fastening tab 416 is generally formed of a strip of metal shaped to follow the contours of the exterior or interior surface of the foam layer 404.

With reference to FIGS. 6A-6B, and FIGS. 6D-6F in some embodiments, the fastening tabs 416 can have a one or more recesses or flat tangs or flanges 419 creating a notched or angled profile. The recesses 419 can allow the overhanging portions 417 to be flush with a surface of the foam and/or flush with mating components of the building to fasten to a support structure of the building. Preferably, the recesses 419 are between 0.25" and 1" in length. The fastening tabs can be installed in a manner such that at least a portion of each fastening tab is concealed from view when the wall panel 400 is installed on the building. The fastening tabs 416 can include angled or filleted corners 478 with radii between 1/32" and 1/16".

Figure 6D:
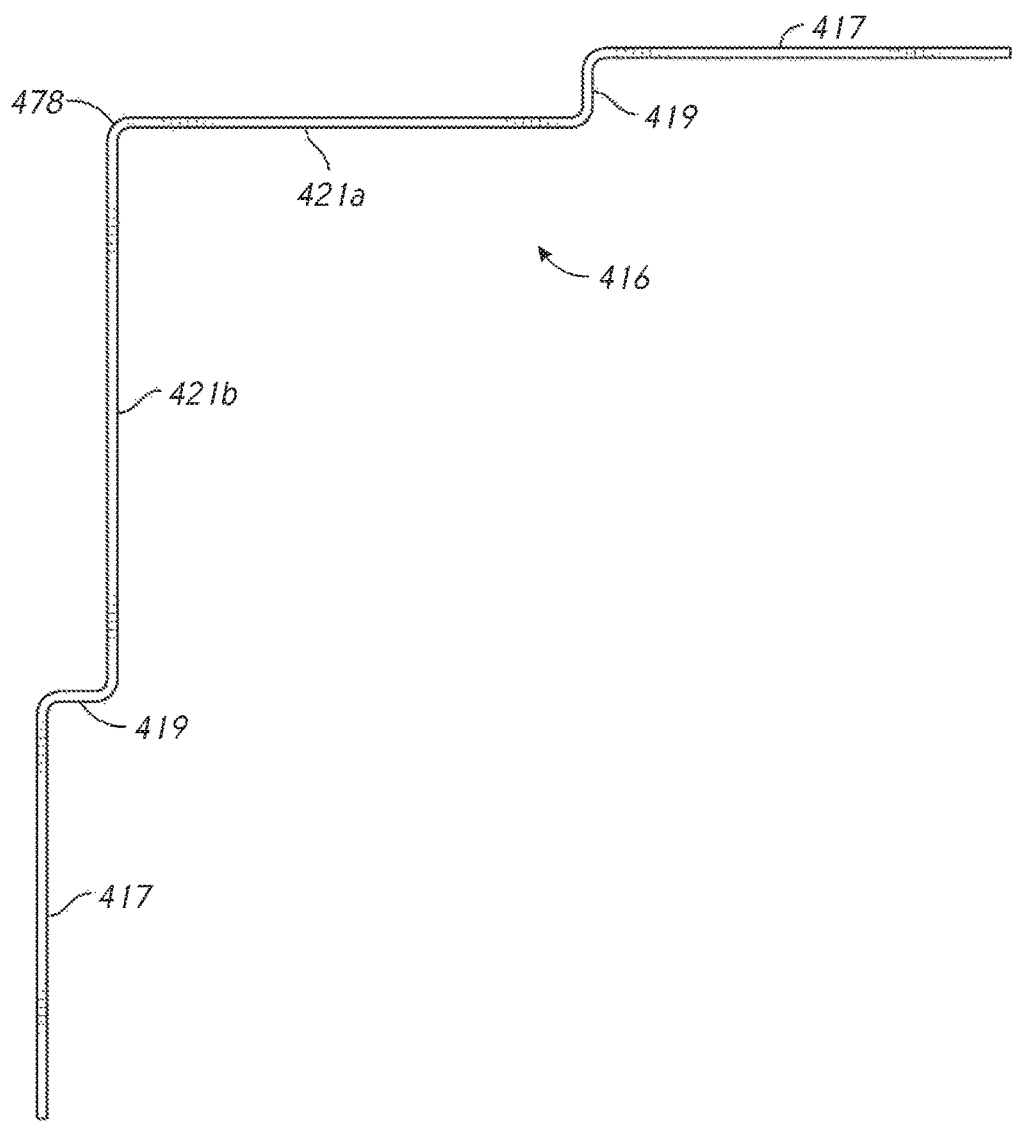
Figure 6E:
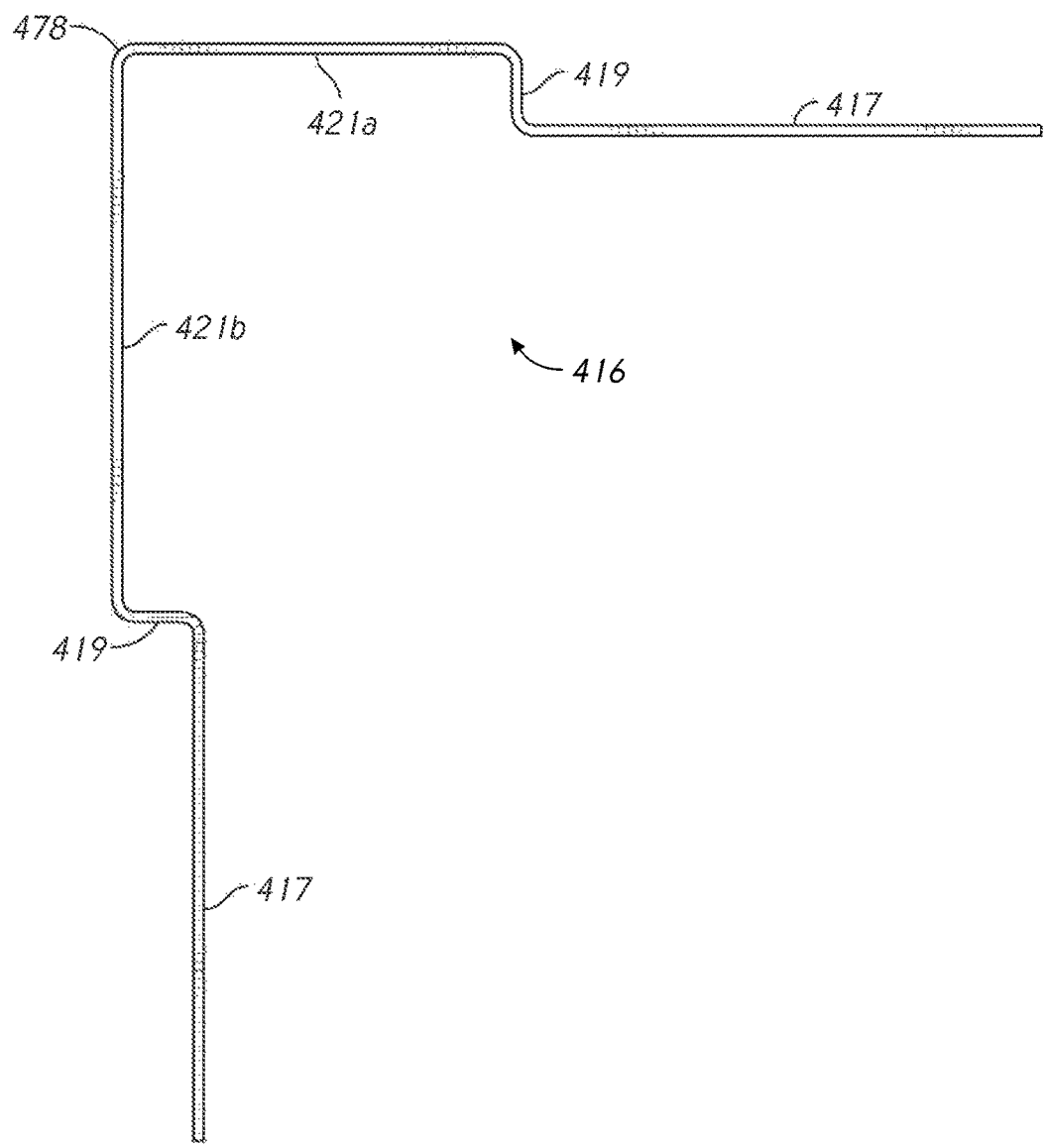
Figure 6F:
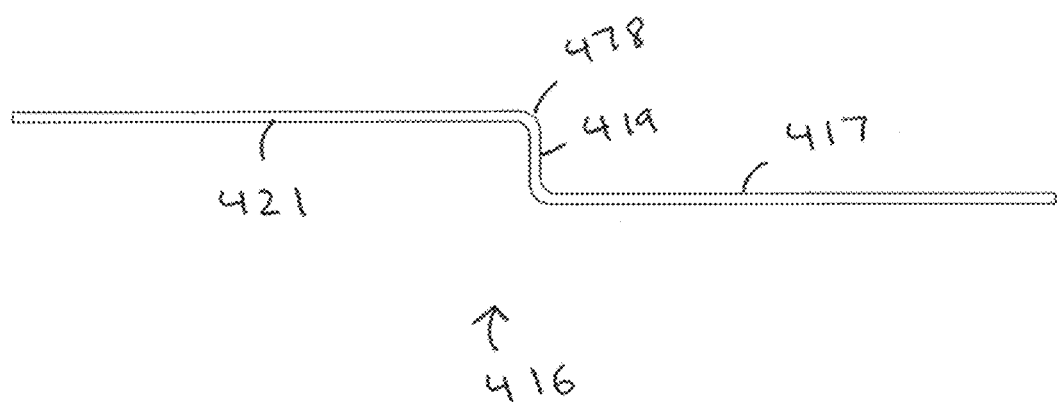

FIGS. 6D-6F illustrate embodiments of fastening tab 416 profiles.

FIG. 6D illustrates an embodiment of a fastening tab 416 profile for use in a fiber cement and foam insulation board installed around an inside corner. In one implementation, portions 421a, 421b of the fastening tabs 416 adjacent the foam layer can be between 3" to 11.5" (7.62 cm to 29.21 cm) (421a) and/or between 4" to 11.5" (10.16 cm to 29.21 cm) (421b), the overhanging portions 417 can be between 3" to 10" (7.62 cm to 25.4 cm), preferably 3" (7.62 cm), the recesses 419 can be between 0.25" (0.635 cm) and 1" (2.54 cm), and the edges 478 can have radii between 1/32" (0.079 cm) and 1/16" (0.159 cm), as depicted in FIG. 6D. Such an embodiment can be used for inside corner installations.

FIG. 6E illustrates an embodiment of a fastening tab 416 profile for use in a fiber cement and foam insulation board installed around an outside corner. In one implementation, portions 421a, 421b of the fastening tabs 416 adjacent the foam layer can be between 1.5" to 10.5" (3.81 to 26.67 cm) (421a) and/or between 2" to 11" (5.08 cm to 27.94 cm) (421b), the overhanging portions 417 can be between 3" to 10" (7.62 cm to 25.4 cm), preferably 3" (7.62 cm), the recesses 419 can be between 0.25" (0.635 cm) and 1" (2.54 cm), and the edges 478 can have radii between 1/32" (0.079 cm) and 1/16" (0.159 cm), as depicted in FIG. 6E. Such an embodiment can be used for inside corner installations.

FIG. 6F illustrates another embodiment of a fastening tab 416 profile for use in an integrated fiber cement and foam insulation panel. In one implementation, portions 421 of the fastening tabs 416 adjacent the foam layer can be between 3" to 10" (7.62 cm to 25.4 cm), the overhanging portions 417 can be between 3" to 10" (7.62 cm to 25.4 cm), preferably 3" (7.62 cm), the recesses 419 can be between 0.25" (0.635 cm) and 1" (2.54 cm), and the edges 478 can have radii between 1/32" (0.079 cm) and 1/16" (0.159 cm) as depicted in FIG. 6F. Such an embodiment can be used for non-corner installations. It should be appreciated that in other embodiments, the length of the portion 421 of the fastening tabs 416 adjacent the foam layer can be sized to any dimensions necessary to match the foam layer length. In one embodiment, the overall thickness of the fastening tab 416 is between 16 to 20 gauge, preferably 18 gauge.

Figure 6G:
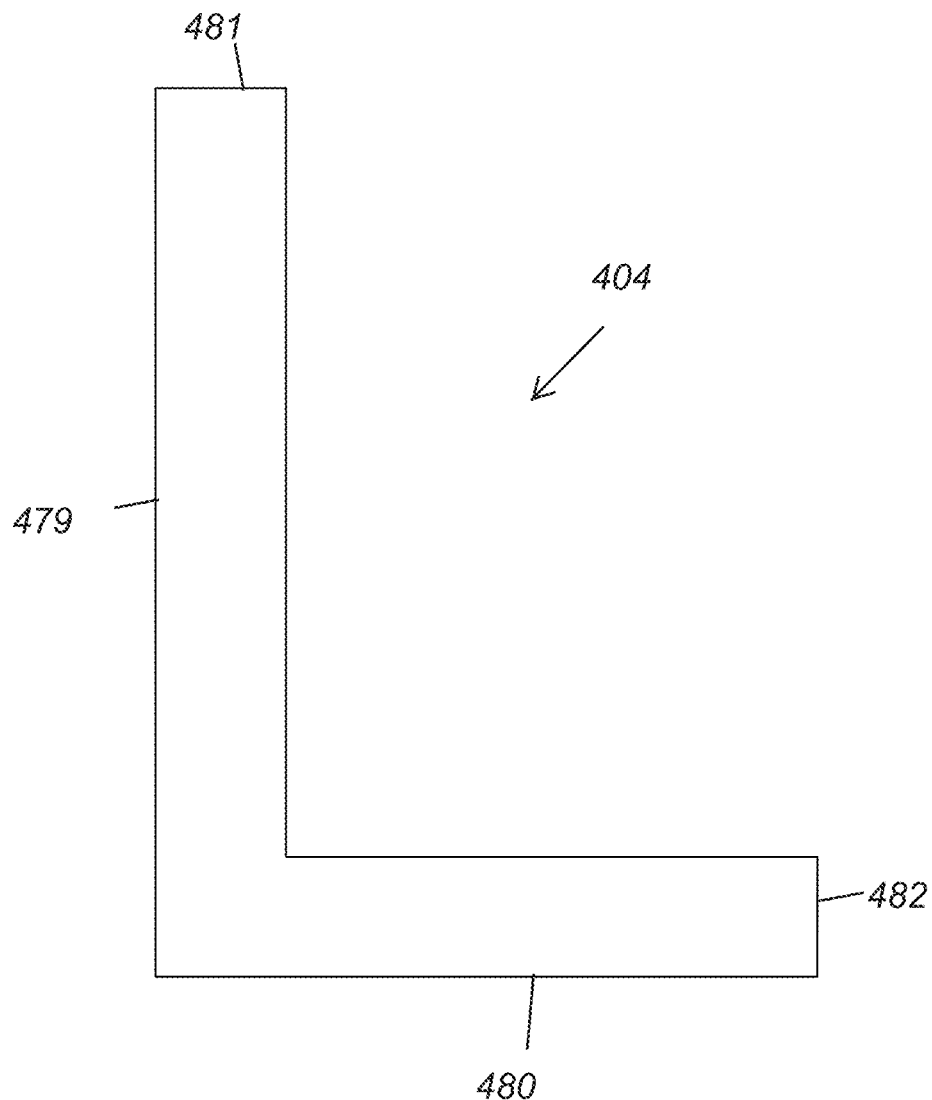
Figure 6H:
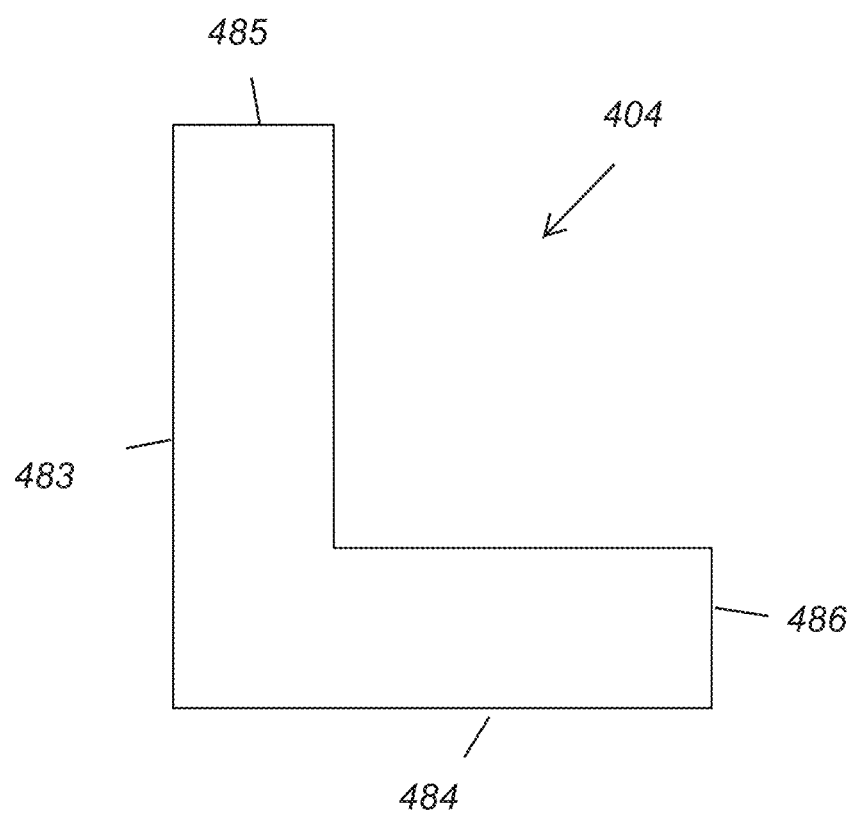
Figure 6I:
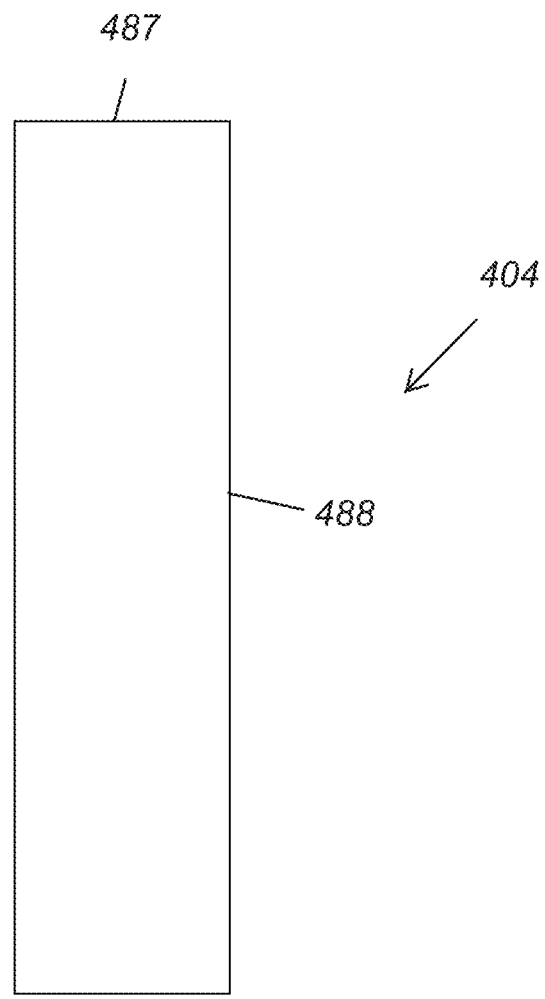

FIGS. 6G-6I illustrate embodiments of foam profiles for use with fastening tabs in fiber cement and foam insulation panels.

FIG. 6G illustrates an embodiment of a foam profile for use in an inside corner section of an integrated fiber cement and foam insulation panel with integrated fastening tabs. In such an embodiment, the foam layer 404 can have an "L" shape configuration and can have a side length 479 between 3.5" to 14" (8.89 cm to 35.56 cm) and a side length 480 between 3.5" to 13" (8.89 cm to 33.02 cm), with thicknesses 481, 482 between 0.25" to 1.5" (0.635 cm to 3.81 cm).

FIG. 6H illustrates an embodiment of a foam profile for use in an outside corner section of a fiber cement and foam insulation panel with integrated fastening tabs. In such an embodiment, the foam layer 404 can have an "L" shape configuration, and can have a side length 483 between 3.5" to 14" (8.89 cm to 35.56 cm) and a side length 484 between 1.5" to 10.5" (3.81 cm to 26.67 cm) with thicknesses 485, 486 between 0.25" to 1.5" (0.635 cm to 3.81 cm).

FIG. 6I illustrates an embodiment of a foam profile for use in a fiber cement and foam insulation panel with integrated fastening tabs. In such an embodiment, the foam layer 404 can have a length 488 between 1.5" to 12" (3.81 cm to 30.48 cm) with a thickness 487 between 0.25" to 1.5" (0.635 cm to 3.81 cm).

In some embodiments, the fastening tabs 416 can be attached to the panel 400 using one or more connecting elements. The connecting elements can include nails, staples, pins, rivets, screws, anchors, clasps, bolts, bucklers, clips, snaps, and other types of fasteners as in known to those of skill in the art. In yet further embodiments, the foam layer can include one or more recess features (not illustrated) in which the tabs are placed such that the tabs do not extend beyond the back wall of the foam layer. In some embodiments, the recess feature in the foam layer may be formed using the same techniques as for forming drainage channels and/or interlocking features in a separate step. In addition, the recess features may be formed out of a mold specifically designed to yield a foam layer having drainage channels, interlocking features, and recess features. In further embodiments, the fastening tabs 416 can attach the panel 400 to the support structure using at least one connecting element described above.

Figure 7:
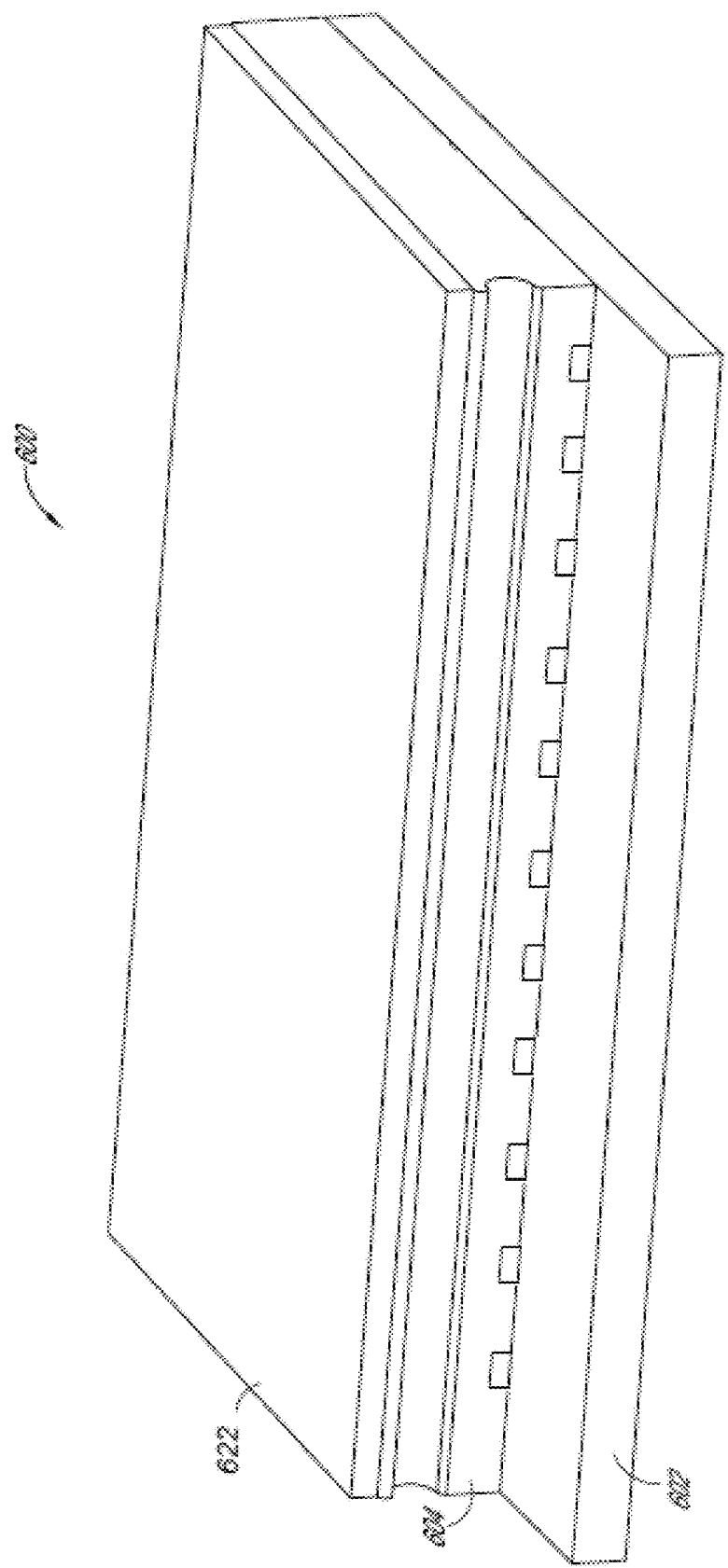
FIG. 7 illustrates yet another embodiment of the present disclosure showing a prefabricated integrated fiber cement and foam insulation panel with a backing disposed on the backside of the foam layer.

FIG. 7 illustrates yet another embodiment of the present disclosure showing a prefabricated panel 600 including a fiber cement layer 602, a backing 622 and a foam layer 604 disposed therebetween connecting the backing 622 to the fiber cement layer 602. In some embodiments, the backing 622 preferably made out of OSB and can be laminated to the foam layer 604. It will be appreciated that the foam layer 604 and/or the fiber cement layer 602 can incorporate various interlocking features to facilitate alignment and sealing of the adjacent layers and drainage channels to facilitate water management.

Figure 8:
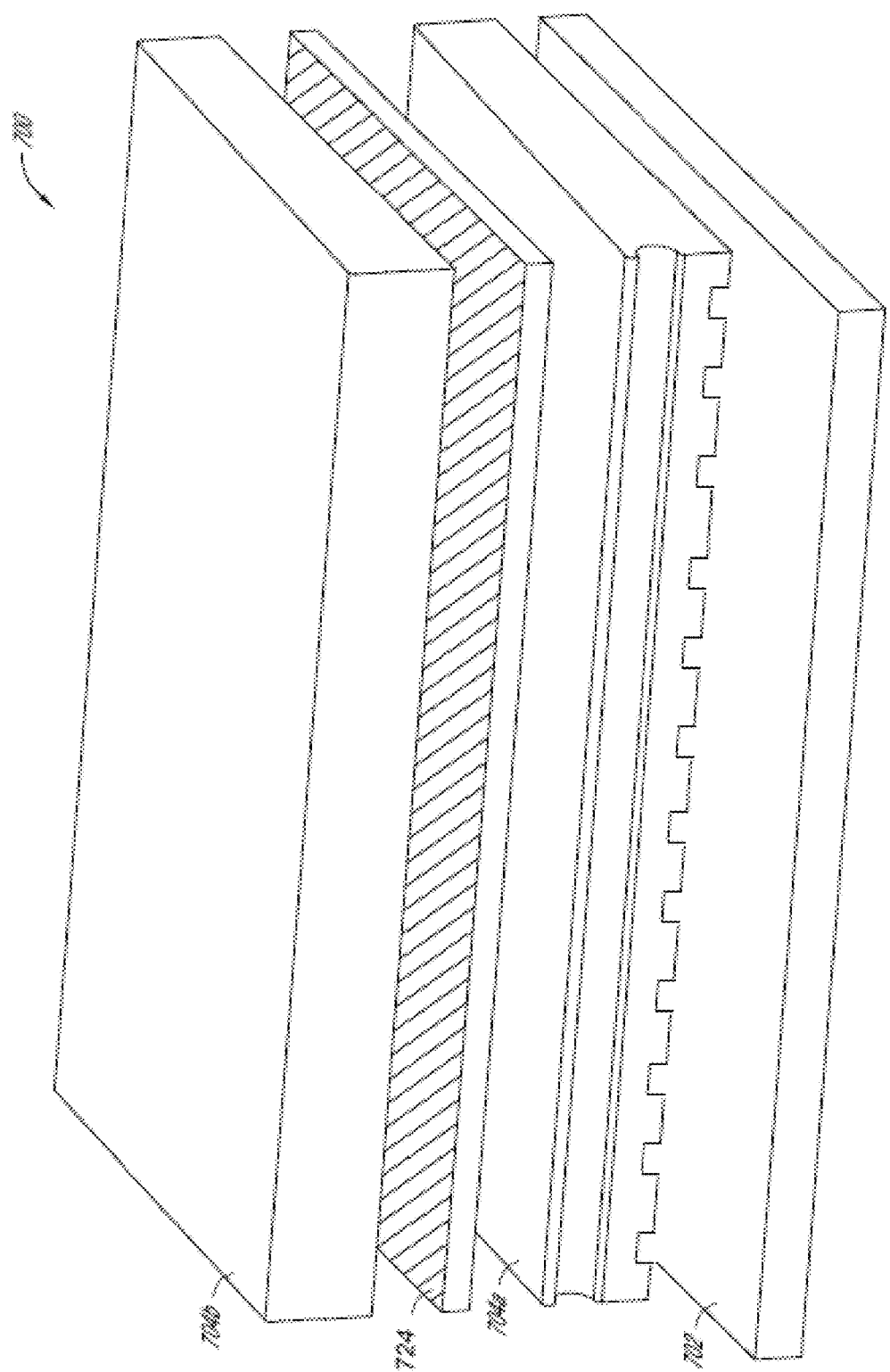
FIG. 8 illustrates yet another embodiment of the present disclosure showing an integrated fiber cement and foam insulation system that incorporates a discontinuous layer in the foam backing for acoustic dampening purposes.

FIG. 8 illustrates yet another embodiment of the present disclosure showing an integrated fiber cement and foam insulation panel 700 incorporating a discontinuous layer 724 in the foam layer 704a, 704b. The discontinuous layer 724 can provide enhanced acoustic dampening properties, reducing unwanted outside noise and vibrations from entering the building and also reducing interior noises from leaving the building. Such an embodiment can act to give further privacy for occupants inside of the building. In some implementations, the discontinuous layer 724 can be made of a viscoelastic material. Preferably, the discontinuous layer 724 is attached to framing members of the wall to dampen vibrations from the exterior of the building from being transmitted to the interior of the building.

Figure 9:
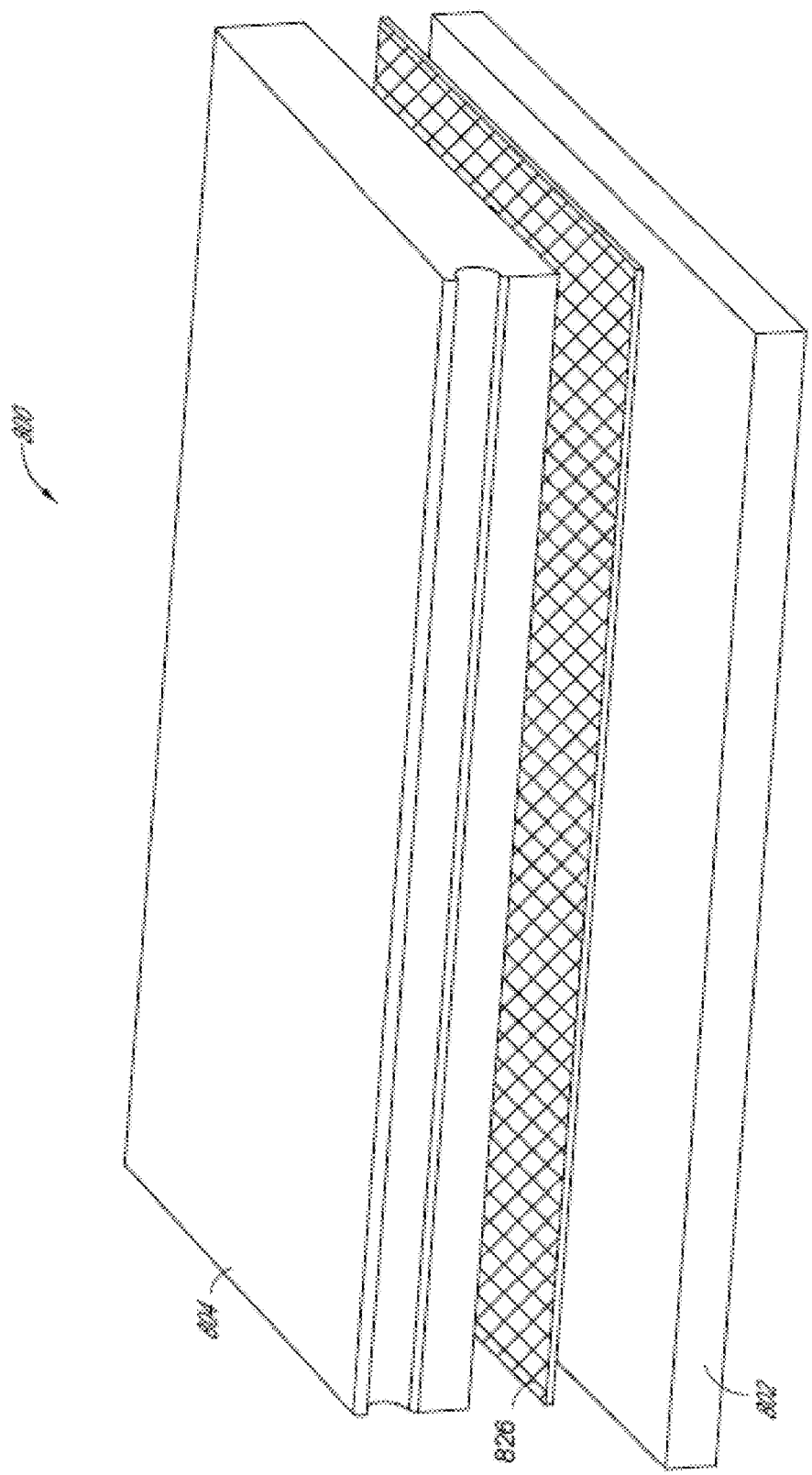
FIG. 9 illustrates an embodiment of the present disclosure showing a fiber cement and foam insulation panel designed for high shear applications.

FIG. 9 illustrates a further embodiment of the present disclosure showing a prefabricated fiber cement and foam insulation panel 800 designed for high shear applications. The panel 800 includes a fiber cement layer 802, a foam layer 804, and a mesh 826 disposed therebetween for reinforcement. In some embodiments, the panel 800 can provide sufficient shear strength to eliminate or substantially reduce the need for structural sheathing, such as OSB. In other embodiments, the foam layers may include facing materials such as meshes or non woven, sheets to enhance the shear strength of the fiber cement and foam insulation panel 800. In yet further embodiments, the panel 800 may also incorporate mesh or reinforcing fibers within the body of the foam layer. The panel may include vapor permeable facing materials adjacent the foam layer, including foils or films to reflect heat or heat loss due to air permeability.

Figure 10A:
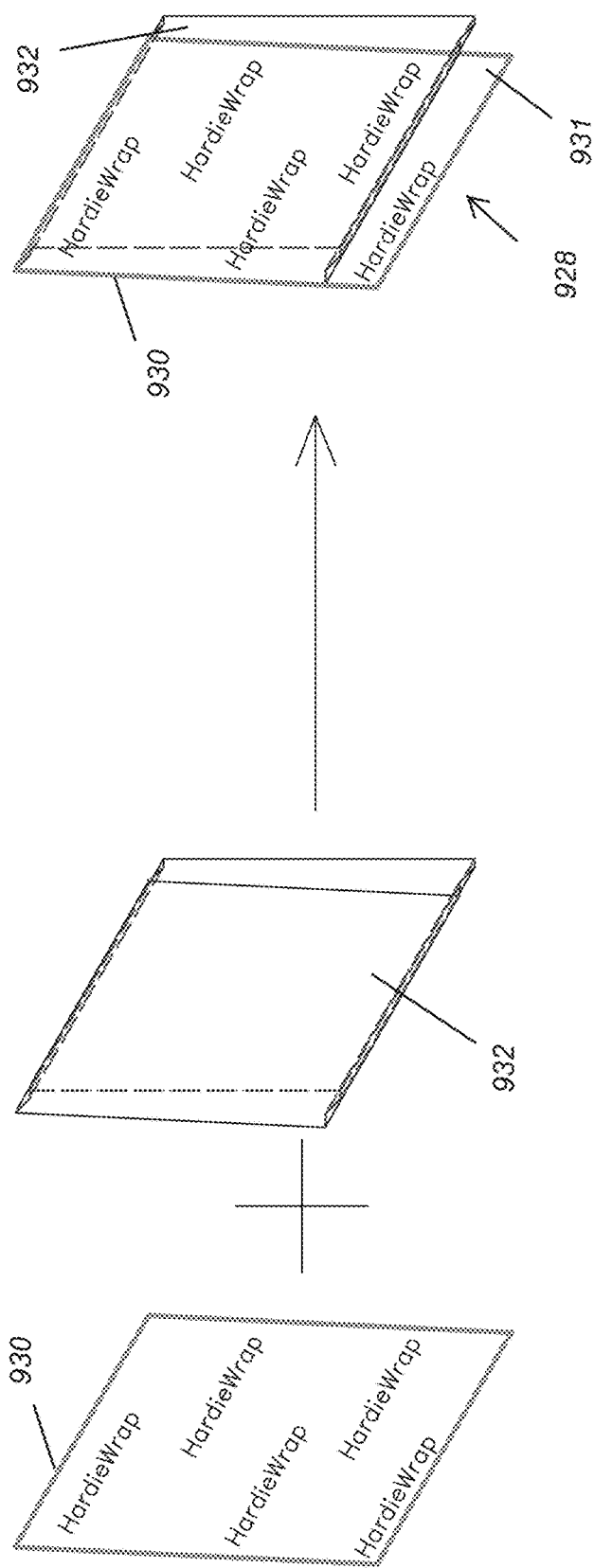
FIGS. 10A-10C illustrate embodiments showing two fiber cement and foam insulation panels joined together with a butt joint.
Figure 10B:
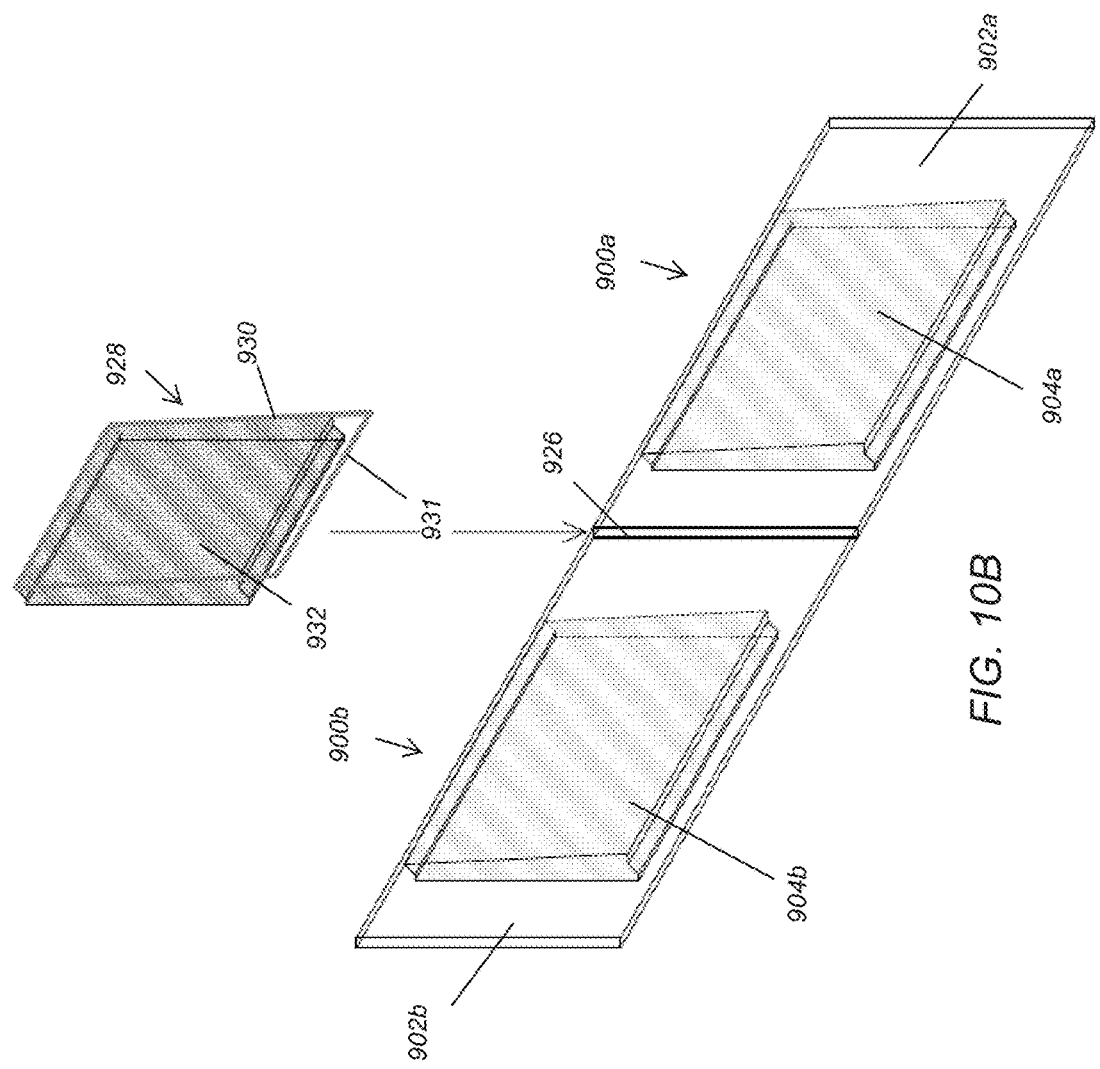
Figure 10C:
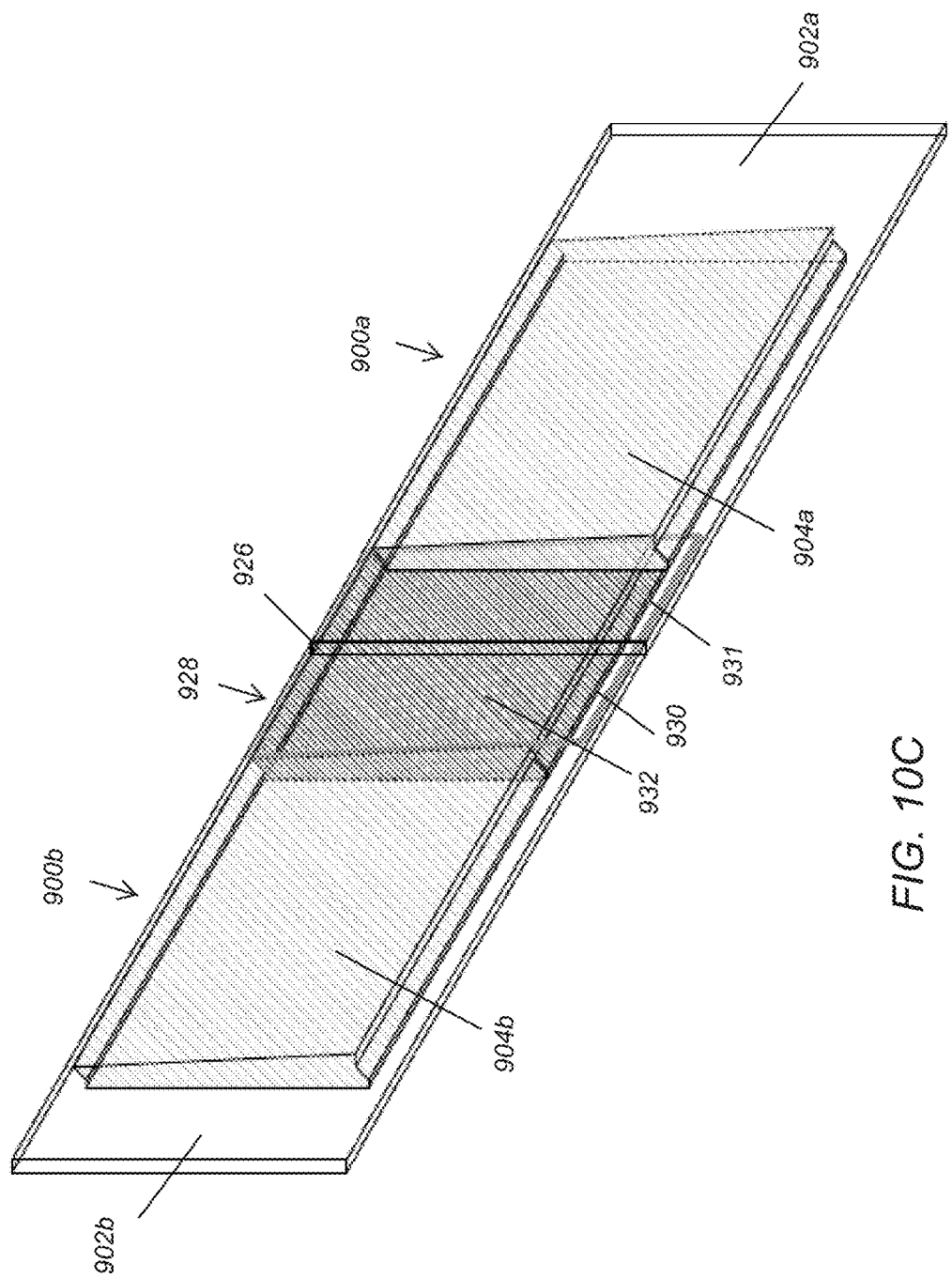

FIGS. 10A-10C illustrate further embodiments of the present disclosure showing two fiber cement and foam insulation panels 900a, 900b joined together with a butt joint 926. The panels include fiber cement layers 902a, 902b and profiled foam layers 904a, 904b. In this embodiment, the profiled foam layers 904a, 904b extend only a partial length of each respective fiber cement layer 902a, 902b, thus leaving a space on both ends of each fiber cement layer configured to receive an insert 928. The insert 928 can be placed at the joint 926 to mitigate water penetration into the wall and allow condensation to drip over the face of the plank below the lap siding. The insert 928 can include a foam layer 932 laminated with a piece of house wrap or flashing 930. The flashing 930 may be used as a water resistive barrier. The flashing 930 can be constructed to be longer than the foam layer 932 such that when joined together to form the insert 928, the flashing includes an overhang 931 which extends beyond a length of the foam layer 93 (best depicted in FIG. 10B). In one preferred embodiment, the foam layer 932 of the insert 928 can have a nominal width of 6 inches (15.24 cm) and the flashing 930 can have an overhang 931 of approximately 1.16 inches (2.95 cm). In one embodiment, the insert 928 can include a foam layer 932 having a profile that matches the profile of the mating foam layers 904a, 904b of the adjacent panels 900a, 900b.

Figure 11A:
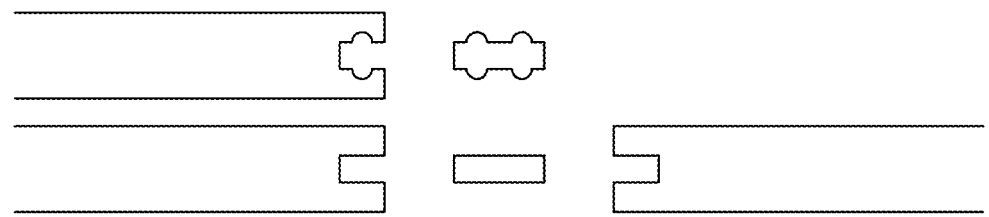
FIGS. 11A and 11B illustrate certain connection mechanisms that can be used to join adjacent integrated fiber cement and foam panels at a butt joint.
Figure 11B:
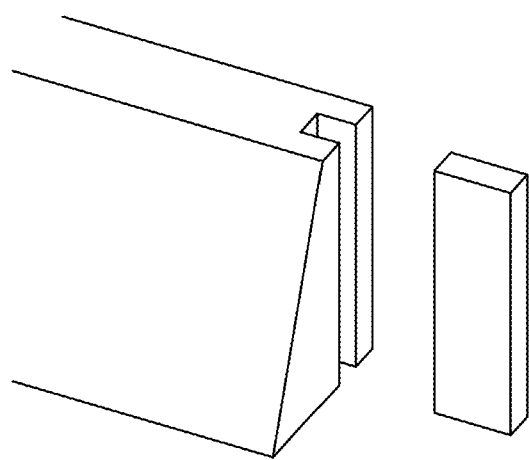

FIGS. 11A and 11B are schematic illustrations of certain connection mechanism that can be used to join adjacent integrated fiber cement and foam panels 1100a, 1100b at a butt joint. In one embodiment, a recess 1101a, 1101b is formed along the lateral edges of each panel 1100a, 1100b. Each recess is configured to receive a portion of an insert 1102a, 1102b designed to join the two panels. The insert 1102a, 1102b can assume a variety of different shapes and configurations. In one embodiment, the insert 1102b is an elongate planar member that can be made out of foam, fiber cement, or other material. The insert 1102b can be inserted between the two panels and slidingly engage with the recesses formed on the edge of each panel. In some embodiments, the insert 1102a is keyed to mate with corresponding patterns in the recess 1101a, 1101b so as to interlock and further secure the two panels.

Figure 12:
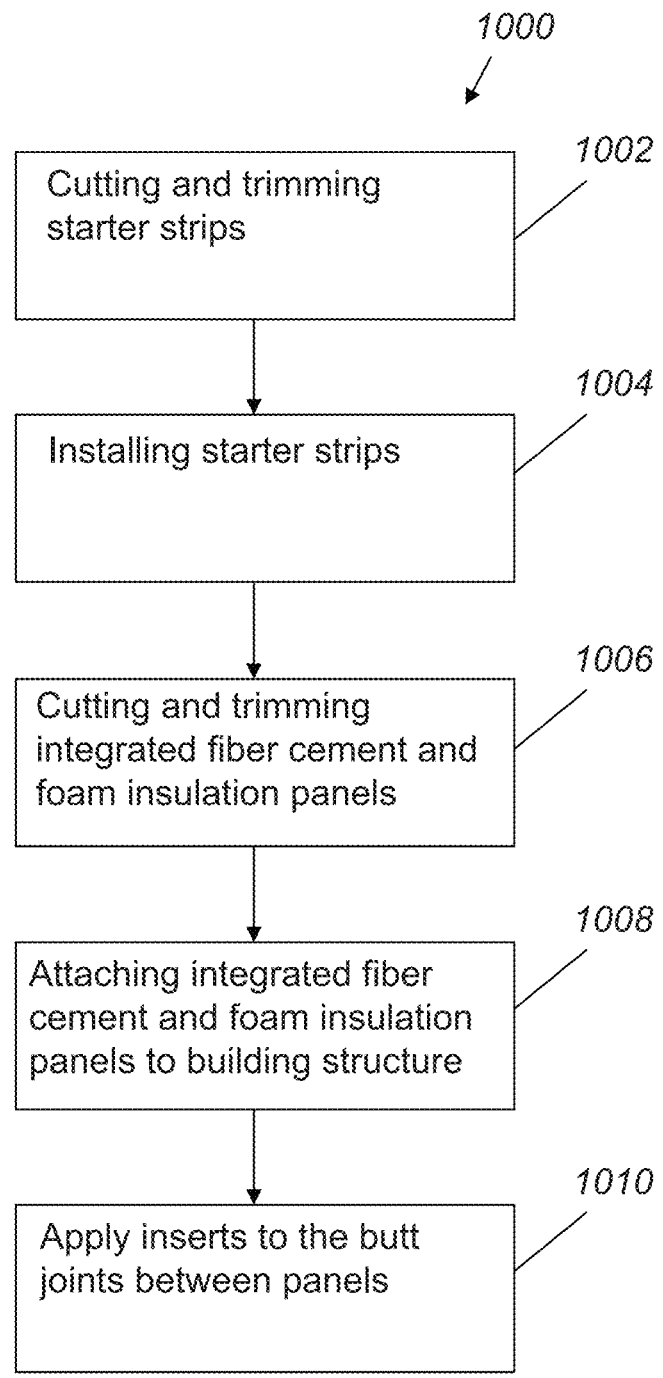
FIG. 12 depicts a flow diagram of installation of fiber cement and foam insulation plants according to one embodiment.

FIG. 12 depicts a flow diagram of installation 1000 of fiber cement and foam insulation panels on a wall according to one embodiment. The method includes cutting and trimming 1002 starter strips. As described above, starter strips can be used to ensure a consistent plank angle for the integrated panels. The method next includes installing 1004 the starter strips at the base of the wall. Starter strips may be fastened to the wall using one or more fasteners described above (e.g. siding nails from 6 d to 16 d). The starter strips may be fastened to a sheathing (when present) or directly to the studs of the building. The method further includes cutting and trimming 1006 the integrated fiber cement and foam insulation panels. The method next includes installing 1008 the fiber cement and foam insulation panels to the wall. In some embodiments, as described above, the panels can include interlocking features for nesting or crotchedly connecting the panels. In some embodiments, as described with reference to FIGS. 6A-6I, panels incorporating fastening tabs can be used. As described above, fastening tabs may be useful in installations where the wall does not include a sheathing to attach the panels to conceal the fasteners. The method optionally includes installing 1010 inserts at the butt joints between adjacent panels, as described with reference to FIGS. 10A-10C and 11A-11B. As described above, the inserts can include a flashing to act as a water resistive barrier.

Figure 13:
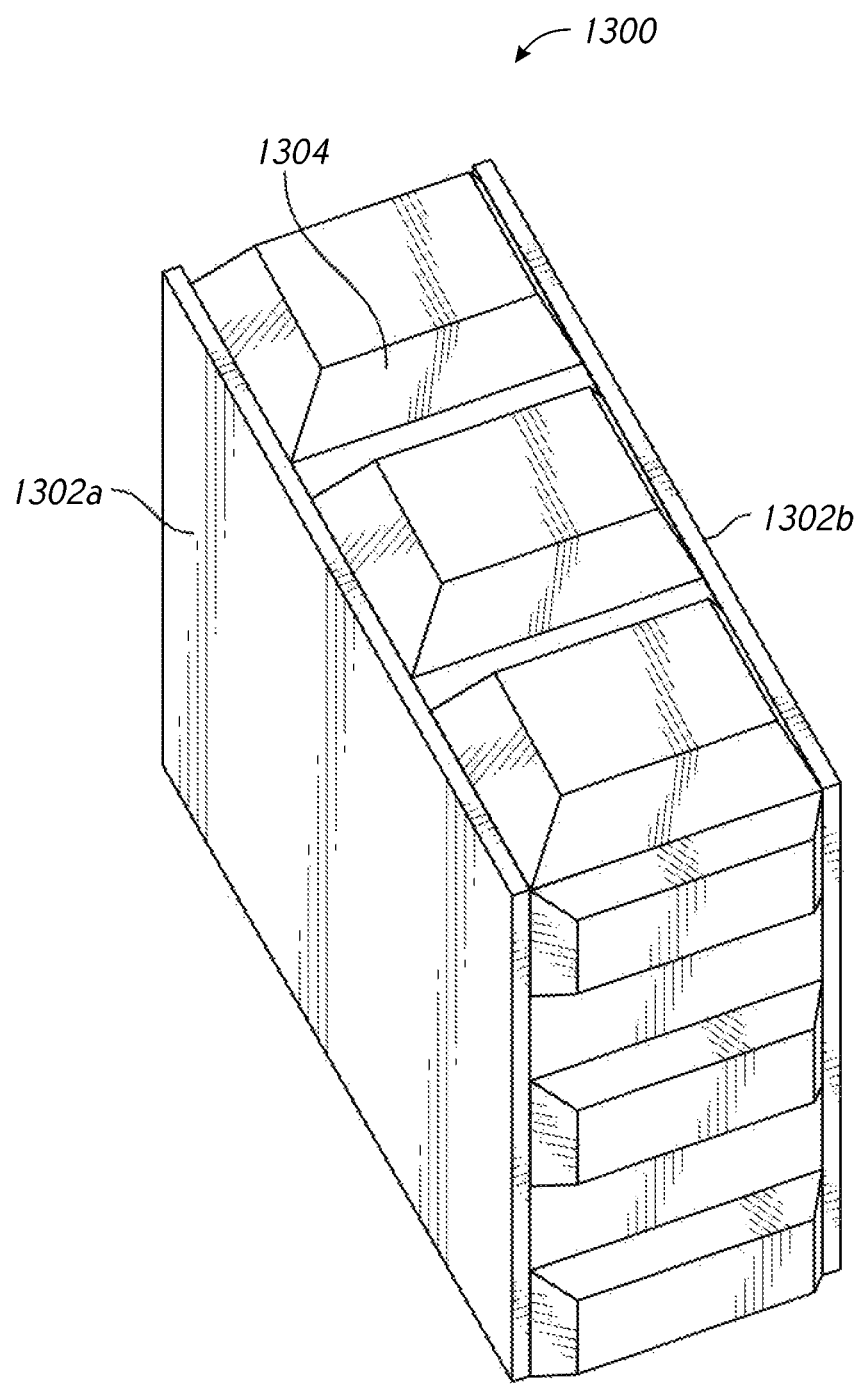
FIG. 13 depicts yet another embodiment of an integrated fiber cement and foam insulation panel.

FIG. 13 illustrates yet another embodiment of an integrated fiber cement and foam insulation panel 1300. The panel 1300 generally includes two fiber cement layers 1302a, 1302b and a profiled foam layer 1304 disposed therebetween. The fiber cement layers 1302a, 1302b can be attached to opposing faces of the foam layer 1304 via a suitable adhesive. As shown in FIG. 13, the thickness of the foam layer 1304 can be substantially greater than the thickness of the fiber cement layers 1302. In some embodiments, the foam layer 1304 includes profiled edges configured to mate and interlock with corresponding edges on adjacent panels, thereby forming a continuous surface. The panel 1300 is preferably pre-fabricated so that it can be used readily at the construction site.

The advantages of the prefabricated integrated fiber cement and foam composite insulation panel include a higher R-value fiber cement building material that is easily installed, provides a building envelope that resists penetration from the elements yet can breath and drain water away from the interior, and a faster installation time when a builder decides to use foam insulation on the structure.

To avoid over-compression and distortion when attaching the integrated fiber cement and foam panels to a wall, the foam preferably has a minimum compressive strength of about 15 psi as determined by ASTM D 6817. In some embodiments, to ensure that the integrated fiber cement and foam system has a minimum wind load resistance of 3.0 kPa ultimate load when tested using an ASTM E 330 vacuum testing apparatus, the minimum compressive strength of the foam is preferably about 15 psi as determined by ASTM 6817. In one embodiment, an integrated fiber cement and foam insulation cladding panel, formed in accordance with the designs disclosed herein, has a wind load of greater than 83 psf, preferably greater than or equal to 94 psf.

The foregoing description of the preferred embodiments of the present disclosure has shown, described and pointed out the fundamental novel features of the inventions. The various devices, methods, procedures, and techniques described above provide a number of ways to carry out the described embodiments and arrangements. Of course, it is to be understood that not necessarily all features, objectives or advantages described are required and/or achieved in accordance with any particular embodiment described herein. Also, although the invention has been disclosed in the context of certain embodiments, arrangements and examples, it will be understood by those skilled in the art that the invention extends beyond the specifically disclosed embodiments to other alternative embodiments, combinations, sub-combinations and/or uses and obvious modifications and equivalents thereof. Accordingly, the invention is not intended to be limited by the specific disclosures of the embodiments herein.

What is claimed is:

1. An integrated fiber cement and foam insulation panel for an exterior cladding system for building structures, the panel configured to be installed with a plurality of identical panels, the panel comprising:
   a foam layer comprising:
      an interlocking feature on two opposing edges of the foam layer, the interlocking feature configured so that an identical panel interlocks with the panel when the panel and the identical panel are installed adjacent to one another;
      a first planar surface; and
      a second planar surface with a plurality of protrusions, the second surface opposite the first planar surface;
   a fiber cement layer attached to the first planar surface of the foam layer; and
   an integrated fastening tab having an overhanging portion extending outwardly from an edge of the foam layer and an edge of the fiber cement layer, the overhanging portion configured for mounting the panel to a support structure, the integrated fastening tab having a portion positioned between the foam layer and the fiber cement layer.

2. The panel of claim 1, wherein the interlocking feature is configured to improve the wind load of a plurality of identical panels installed on a building structure.

3. The panel of claim 1, wherein the interlocking feature comprises complementary shaped tongue and groove configurations.

4. The panel of claim 1, wherein the foam layer is configured to interlock with a foam layer of an identical panel through the interlocking feature.

5. The panel of claim 1, wherein the plurality of protrusions form a plurality of drainage channels.

6. The panel of claim 5, wherein the plurality of protrusions form a pattern that provides the plurality of drainage channels.

7. The panel of claim 1, wherein the fiber cement layer further comprises a plurality of drainage channels formed on a surface of the fiber cement layer.

8. The panel of claim 1, wherein the fiber cement layer further comprises a plurality of drainage channels formed within the fiber cement layer.

9. The panel of claim 1, wherein the foam layer is configured to be sufficiently porous to allow water to flow through the foam layer.

10. The panel of claim 1, wherein the foam layer is configured to be sufficiently porous to allow water to flow through the foam layer.

11. The panel of claim 1, wherein the fiber cement layer comprises an oriented strand board.

12. The panel of claim 1, wherein the fiber cement layer comprises a shingle.

13. The panel of claim 1 further comprising a discontinuous layer in the foam layer.

\* \* \* \* \*